(12) United States Patent
Mitsch

(10) Patent No.: US 10,711,859 B2
(45) Date of Patent: Jul. 14, 2020

(54) VIBRATION ABSORBER HAVING A ROTATING MASS

(71) Applicant: FM ENERGIE GMBH & CO. KG, Heppenheim (DE)

(72) Inventor: Franz Mitsch, Heppenheim (DE)

(73) Assignee: FM Energie GmbH & Co. KG, Heppenheim (DE)

( * ) Notice: Subject to any disclaimer, the term of this patent is extended or adjusted under 35 U.S.C. 154(b) by 123 days.

(21) Appl. No.: 15/755,575

(22) PCT Filed: Aug. 23, 2016

(86) PCT No.: PCT/EP2016/001421
§ 371 (c)(1),
(2) Date: Feb. 27, 2018

(87) PCT Pub. No.: WO2017/036581
PCT Pub. Date: Mar. 9, 2017

(65) Prior Publication Data
US 2018/0252287 A1    Sep. 6, 2018

(30) Foreign Application Priority Data

Aug. 28, 2015 (EP) .................................. 15002459

(51) Int. Cl.
*E04B 1/98* (2006.01)
*F16F 7/10* (2006.01)
(Continued)

(52) U.S. Cl.
CPC .......... *F16F 7/1022* (2013.01); *E04H 9/0215* (2020.05); *F16F 7/10* (2013.01);
(Continued)

(58) Field of Classification Search
CPC .......... F16F 7/10; F16F 7/1022; E04B 1/985; E04H 9/02; E04H 9/023
(Continued)

(56) References Cited

U.S. PATENT DOCUMENTS 4,407,395 A * 10/1983 Suozzo .................... F16L 3/202
                                                      188/134
5,442,883 A *  8/1995 Nishimura ............. E04B 1/985
                                                       52/167.2
(Continued)

FOREIGN PATENT DOCUMENTS

EP    1 008 747 A2    6/2000
EP    2 746 483 A1    6/2014
(Continued)

OTHER PUBLICATIONS

International Search Report Corresponding to PCT/EP2016/001421 dated Dec. 2, 2016.
(Continued)

*Primary Examiner* — Christopher P Schwartz
(74) *Attorney, Agent, or Firm* — Davis & Bujold PLLC; Michael J. Bujold

(57) ABSTRACT

A novel vibration absorber for damping vibrations of a building or a machine installation having an inherent frequency of preferably below 1 Hz, preferably below 0.5 Hz, in particular, <0.25 Hz, as may occur, for example, in wind turbines or also other tall slim buildings or installations. The vibration absorber which, besides a main mass which is fixed per se and is moved along a track analogous or similar to a pendulum mass, has a substantially smaller, variably adjustable rotating flywheel mass, which can be moved with the main mass on the track thereof and with the aid of which the frequency of the absorber can be finely adjusted or adapted.

36 Claims, 18 Drawing Sheets

(51) Int. Cl.
*E04H 9/02* (2006.01)
*F03D 13/20* (2016.01)

(52) U.S. Cl.
CPC ........ *F03D 13/20* (2016.05); *F05B 2260/964* (2013.01); *Y02B 10/30* (2013.01)

(58) Field of Classification Search
USPC ....... 188/378–380; 52/167.1–167.7; 267/136
See application file for complete search history.

(56) References Cited

U.S. PATENT DOCUMENTS

| | | | | |
|---|---|---|---|---|
| 5,713,163 | A * | 2/1998 | Mutaguchi | B61B 12/04 114/121 |
| 5,934,029 | A * | 8/1999 | Kawai | E04H 9/023 52/167.1 |
| 6,164,022 | A * | 12/2000 | Ishikawa | B23Q 1/48 52/167.1 |
| 6,230,450 | B1 * | 5/2001 | Kuroda | E04H 9/02 188/322.5 |
| 6,385,917 | B1 * | 5/2002 | Konomoto | E04H 9/021 52/167.1 |
| 7,716,881 | B2 * | 5/2010 | Tsai | E04H 9/023 248/636 |
| 8,484,911 | B2 * | 7/2013 | Zayas | E04H 9/023 248/562 |
| 8,672,107 | B2 * | 3/2014 | Ivanco | F16F 7/116 188/380 |
| 2019/0024535 | A1 * | 1/2019 | Mitsch | F16F 7/1011 |

FOREIGN PATENT DOCUMENTS

| | | |
|---|---|---|
| JP | H04-101838 U | 9/1992 |
| JP | H08-200438 A | 8/1996 |
| WO | 97/00403 A1 | 1/1997 |
| WO | 2009/068599 A2 | 6/2009 |

OTHER PUBLICATIONS

Written Opinion Corresponding to PCT/EP2016/001421 dated Dec. 2, 2016.

* cited by examiner

Fig. 2A
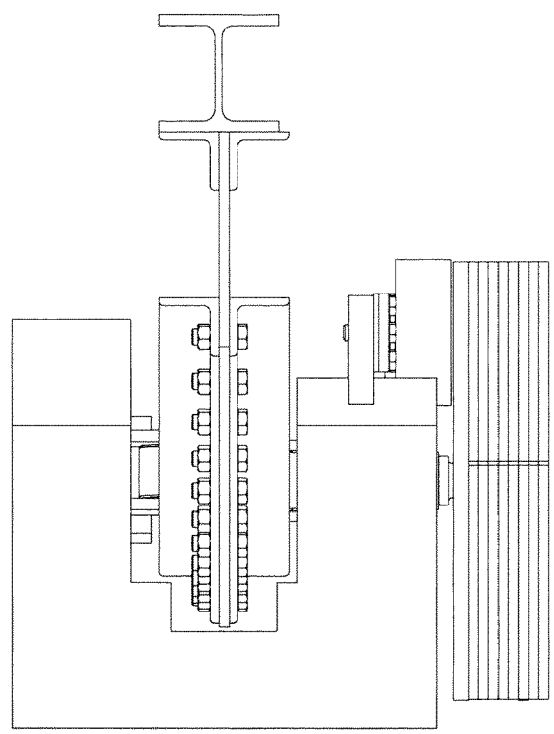
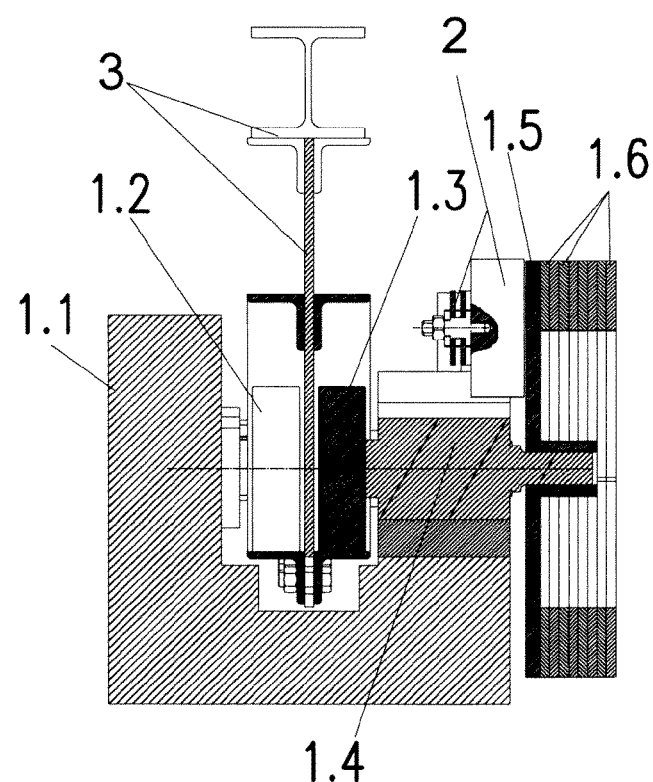
Fig. 2B

5

10

4C
4C

Fig. 8C
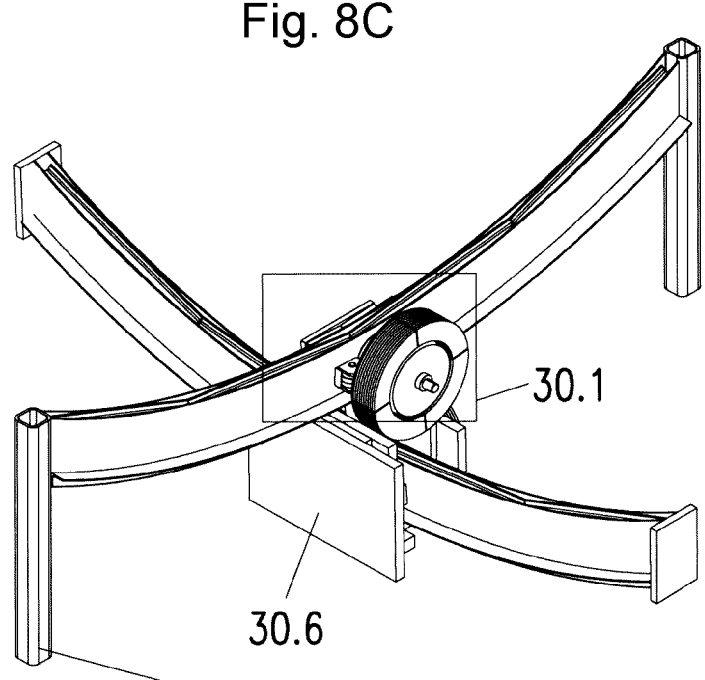
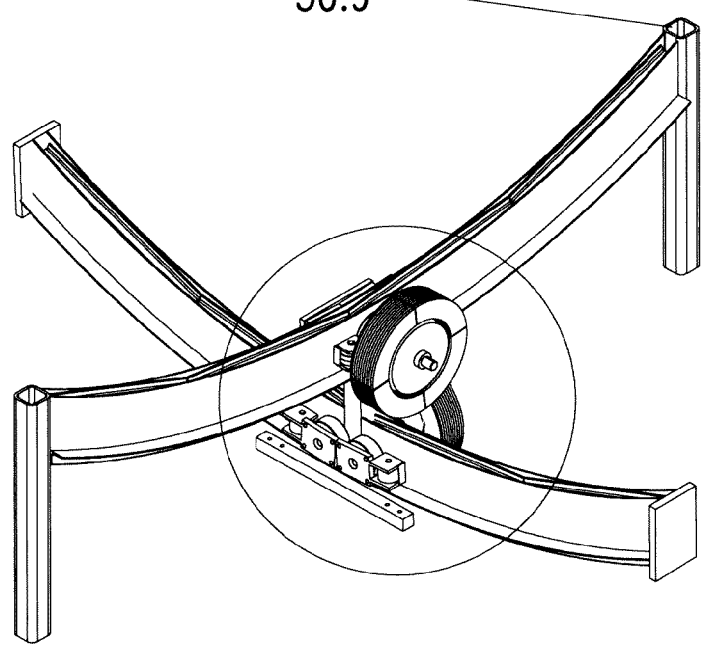
Fig. 8D 40.5

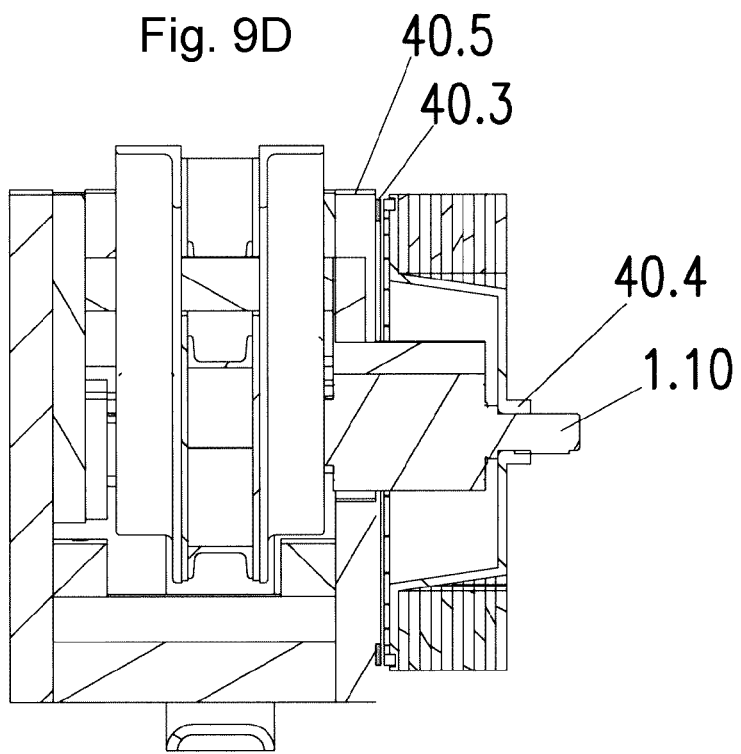
Fig. 9D
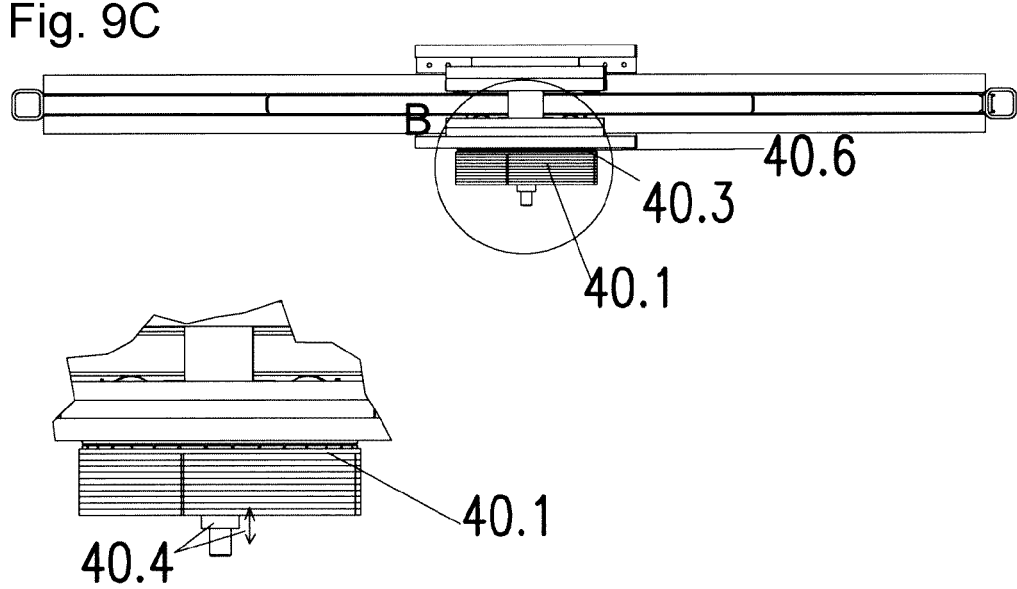
Fig. 9C
Fig. 9E

Fig. 10C
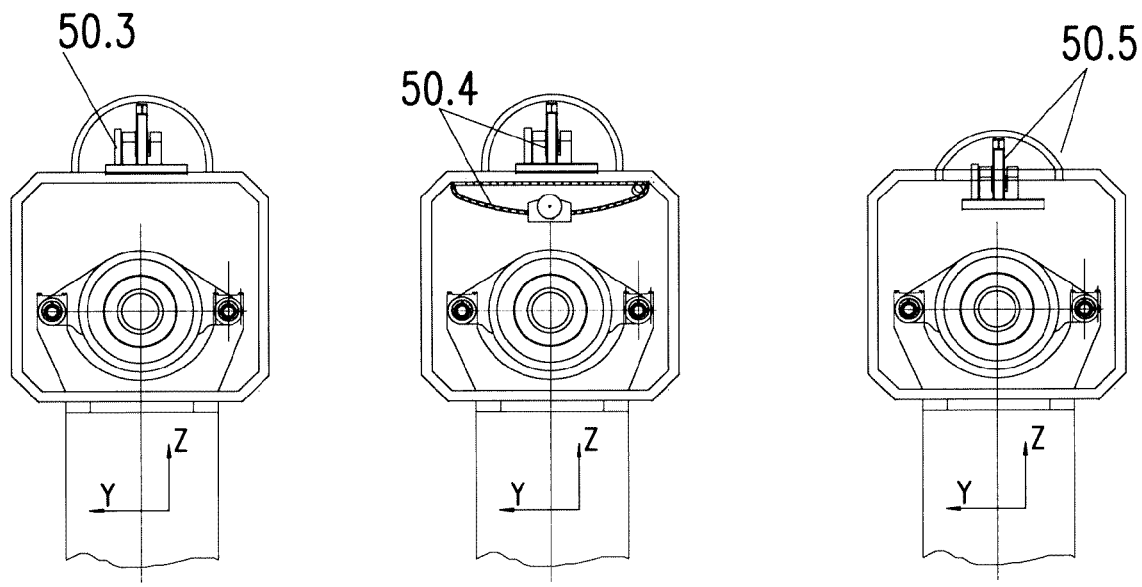
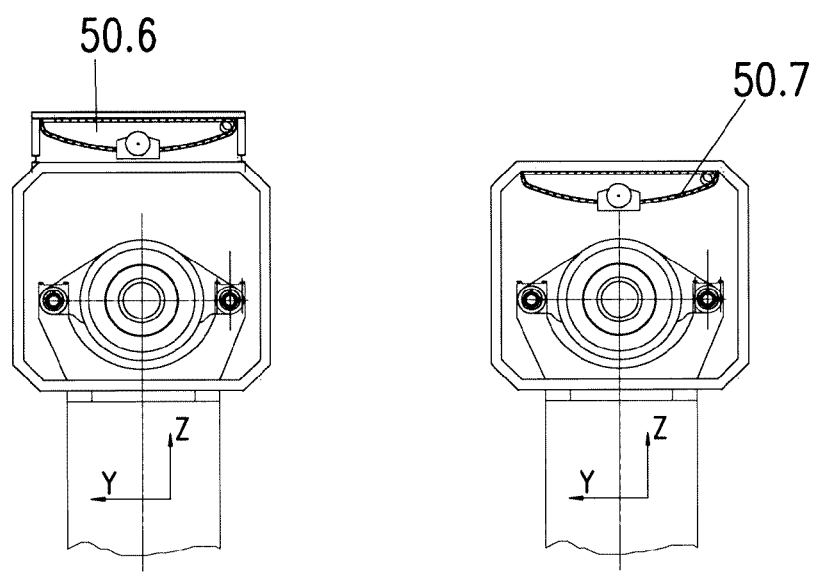
Fig. 10D

Fig. 13A
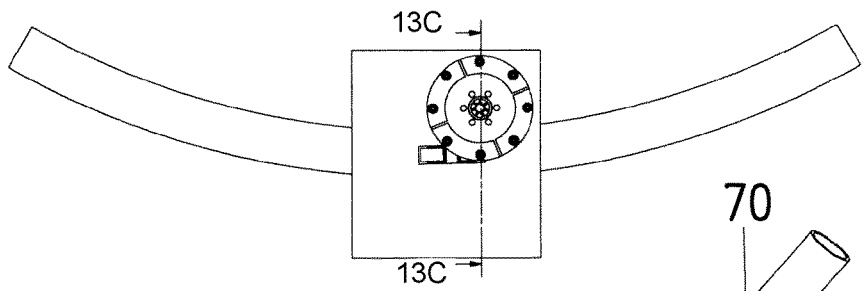
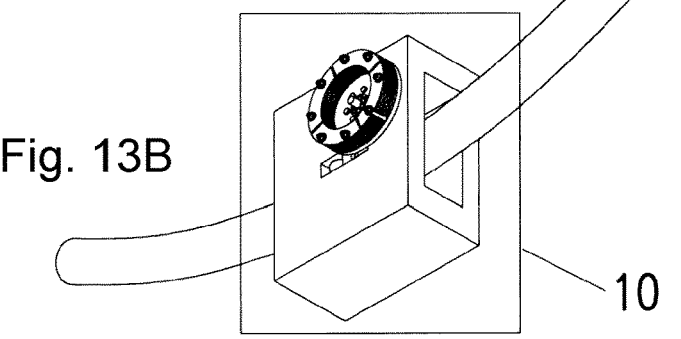
Fig. 13B
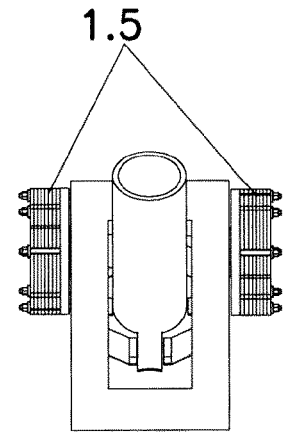
Fig. 13C
Fig. 14A
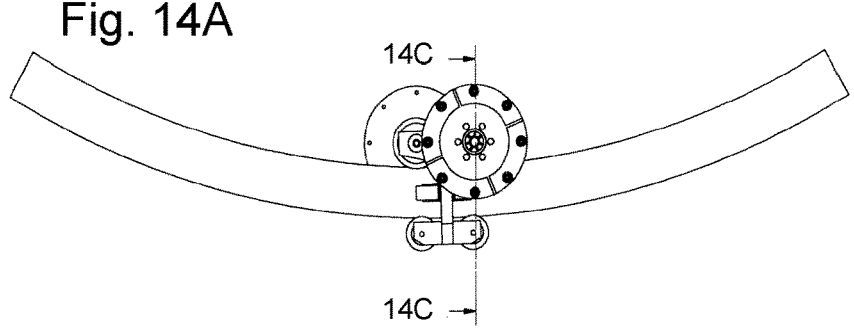
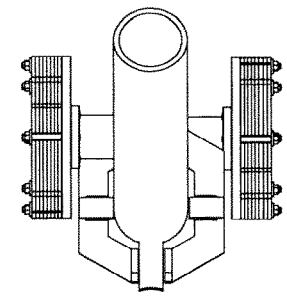
Fig. 14C
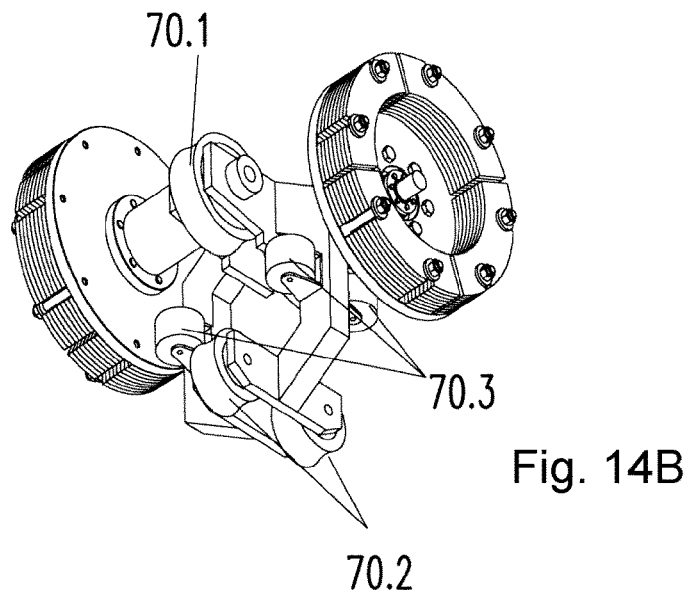
Fig. 14B

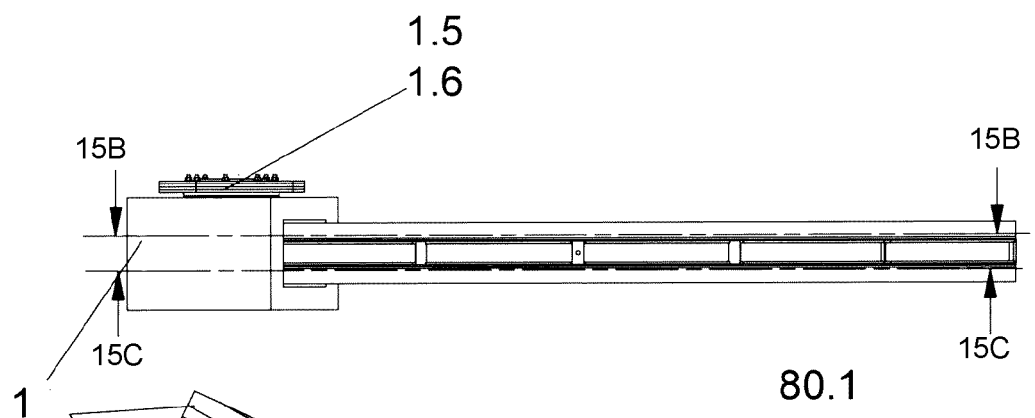
Fig. 15A
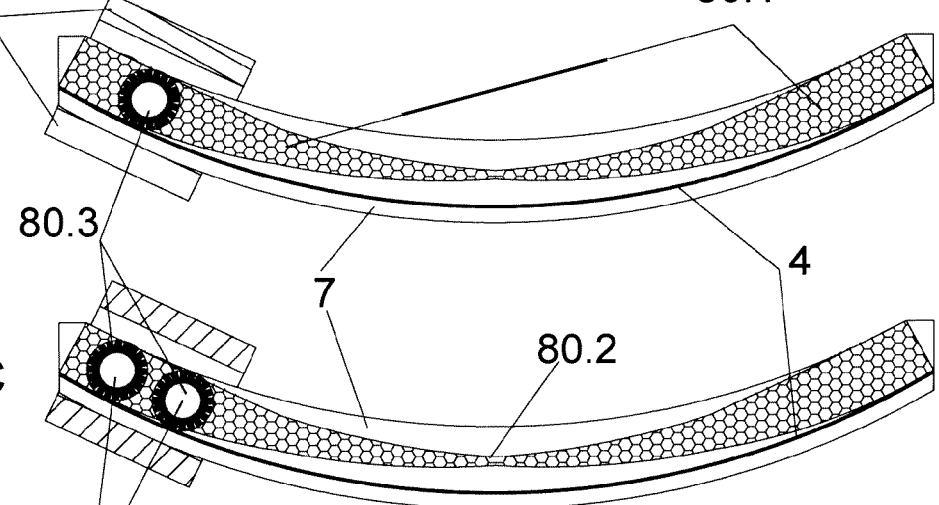
Fig. 15B
Fig. 15C
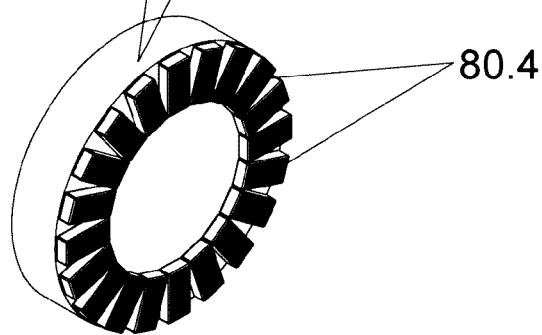
Fig. 15D

Fig. 16A
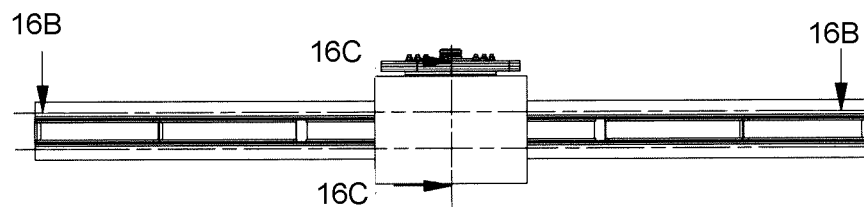
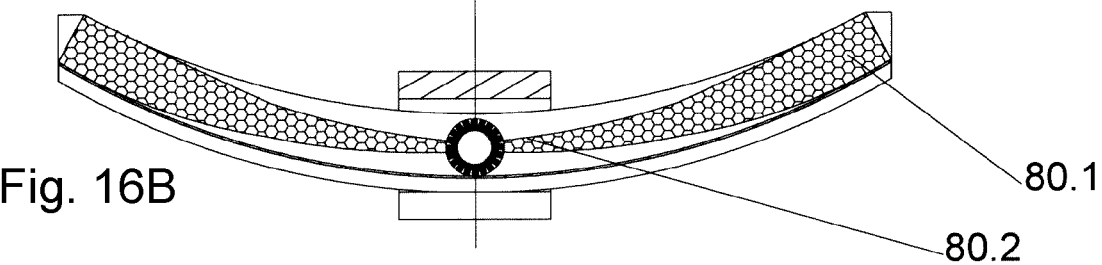
Fig. 16B
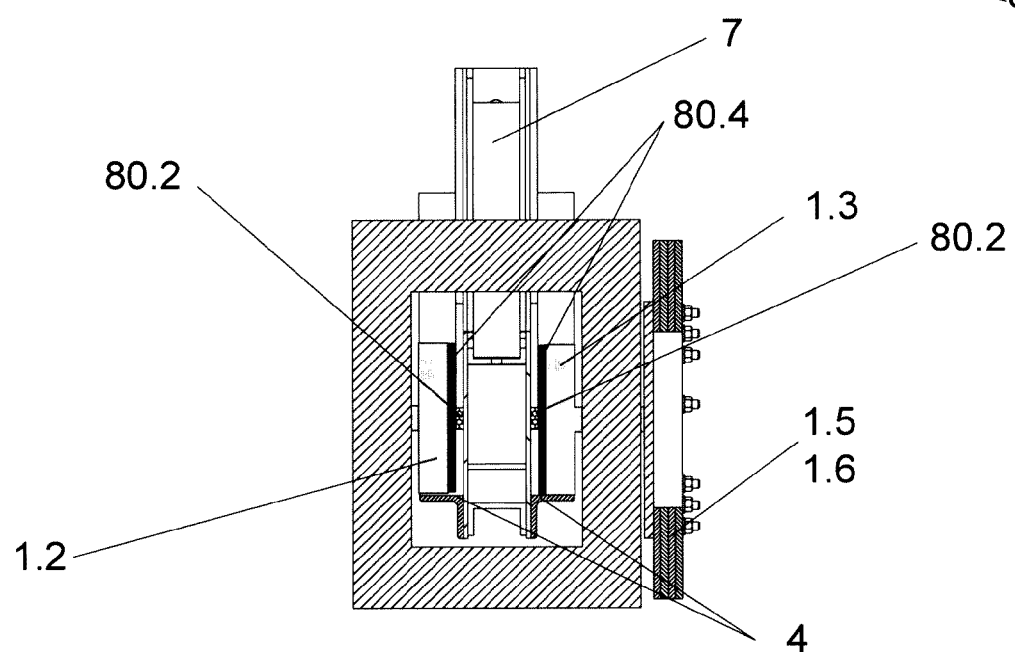
Fig. 16C

Fig. 17A
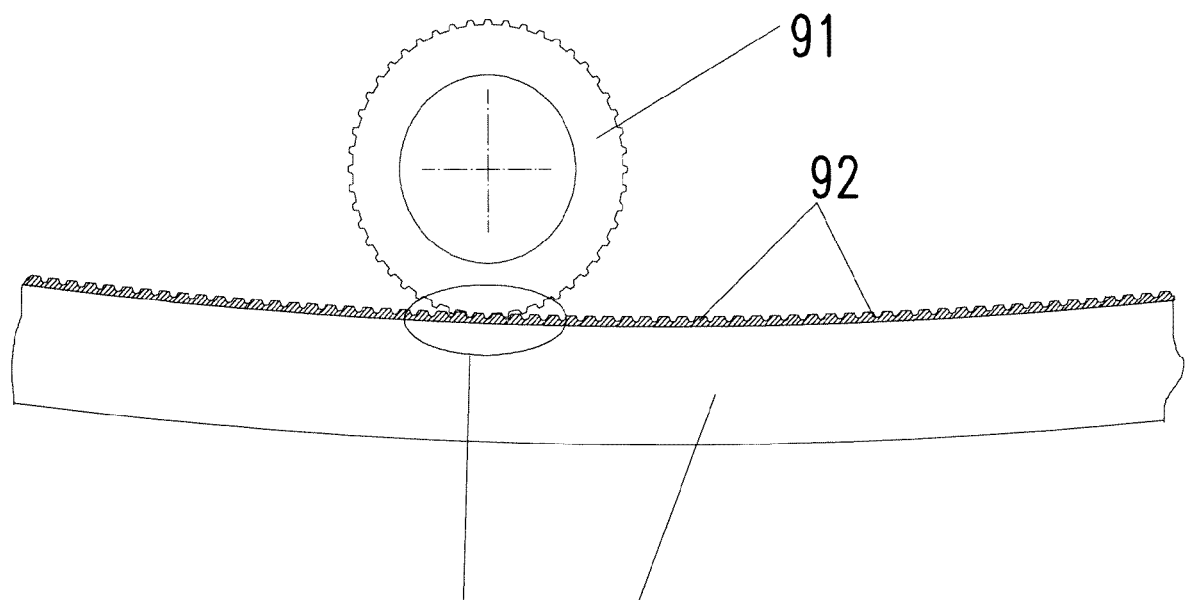
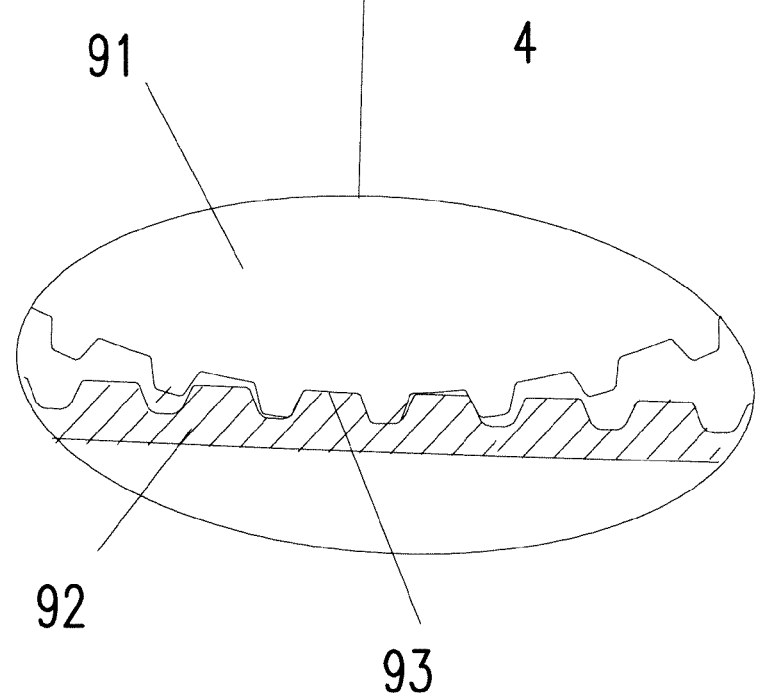
Fig. 17B

VIBRATION ABSORBER HAVING A ROTATING MASS

This application is a National Stage completion of PCT/EP2018/001421 filed Aug. 23, 2016, which claims priority from European patent application serial no. 15002459.2 filed Aug. 28, 2015.

FIELD OF THE INVENTION

The invention relates to a novel vibration absorber for damping vibrations of buildings or machine installations having an inherent frequency of preferably <1 Hz, preferably <0.5 Hz, in particular, <0.25 Hz, as may occur, for example, in wind turbines or also other tall slim buildings or installations. The invention relates, in particular, to vibration absorbers which, besides a main which is fixed per se and is moved along a track analogous or similar to a pendulum mass, has a substantially smaller, variably adjustable rotating flywheel mass, which can be moved with the main mass on the track thereof and with the aid of which the frequency of the absorber can be finely adjusted or adapted. The invention furthermore also relates to arrangements or combinations of vibration absorbers of this type having different vibration characteristics and to the use thereof in, in particular, wind turbines, and finally to wind turbines themselves which contain vibration absorbers and vibration absorber arrangements of this type.

BACKGROUND OF THE INVENTION

Tall and slim buildings and installations are subjected to particular vibration conditions which have to be taken into consideration by technical measures in order that no damage or premature fatigue processes occur. This applies, in particular, to wind turbines, which, owing to their rapid technical development in recent years, are increasingly also being employed in more extreme locations (e.g. offshore) and heights, and in addition have ever-higher towers in order to utilise the better wind conditions there. Such wind turbines have to withstand the forces acting on them due to wind, waves, weather and operation, which load the installations to different extents at different places. Vibration forces in particular can endanger the operation and safety of the installations. It is thus necessary to damp the vibrations occurring in these installations specifically and effectively by technical measures. This is carried out using vibration absorbers or vibration dampers of various design in accordance with the diverse different fields of use.

Thus, there are, for example, installations in which critical vibrations only represent a problem due to so-called Karmann vortex excitation. Since the rotating rotor generally effects very good damping of the wind turbine, vortexes of this type only occur at standstill. Owing to the damping of the rotor blades, which are transverse to the wind at standstill, an installation of this type can only be excited in the longitudinal direction. Since the Karmann vortex excitation takes place at 90° to the wind direction, this case only occurs in the transverse direction, more precisely only if the installation does not follow the wind direction. In installations of this type, it is therefore sufficient if a vibration absorber only works at standstill of the installation.

Of course, wind turbines also vibrate transverse to the rotor axis in operation. In this direction, the damping by the rotor is very small, so that, in particular in the case of very tall towers, additional damping by vibration absorbers in the transverse direction is also necessary.

Furthermore, there are installations which are constructed in the sea and are excited to vibration in all directions by wave excitation. During operation, such installations, owing to the rotor which is only damped in the axial direction by wind, react, in particular, to waves moved perpendicular to the wind direction. Vibration absorbers which act transversely to the rotor axis are therefore also necessary there during operation of the installation. Owing to the fact that such installations are also excited in all directions at standstill, vibration absorbers which act in the rotor direction and transversely to the rotor direction are also required from case to case.

Furthermore, there are excitations which are excited by the rotation of the rotor. These are on the one hand excitations by the rotor on passing through the resonant frequency of the tower. Towers are likewise excited by rotor frequencies which are close to the resonant frequency of the tower.

Thus, there are a number of different tasks for vibration absorbers in accordance with the excitation frequencies, some may be mentioned here: (i) vibration absorbers in the axial direction at standstill, (ii) vibration absorbers in the transverse direction at standstill and during operation, (iii) vibration absorbers in the horizontal plane at standstill, and (iv) vibration absorbers in the horizontal plane at standstill and during operation. Most interfering forces also act on the tower of the installation, which is generally excited to vibration with a low resonant frequency usually <1 Hz. For this reason, pendulum absorbers, which are usually suspended in the tower, are often employed in the prior art for vibration damping.

Pendulum absorbers for wind turbines are described, for example, in EP 1008747 (B1) or in WO 2009/068599. Classical pendulums are used here, but these can only move over small swing distances owing to the small space available for movement in the tower, which has the consequence that the absorber masses required must be fairly large in order to be able to exert an influence on the corresponding resonant frequency. In order to counter this, space-saving solutions have been proposed.

Thus, JP 08-200438 (A) discloses a vibration absorber which comprises an absorber mass which is fitted with rollers and is able to roll to and fro thereon on a circular rail arrangement which is curved in a concave manner towards the inside, where the mass moves de facto like the mass of a virtual pendulum with a pendulum rod or pendulum cable corresponding to the circle radius. Whereas the coarse adjustment to the resonant frequency is defined by the coarse configuration of the system (mass, rail dimensions, length, et cetera), the fine tuning of the resonant frequency in this system can only be carried out by changing the rail curvature, which is technically very complex and in some cases not possible at all.

EP 2746483 (A1) presents a roller absorber, likewise based on a pendulum movement, for a wind turbine, in which an optionally variable absorber mass can be moved out of a central position on a wheel/rail arrangement by restoring forces, in particular spring forces. The absorber mass/rail arrangement is arranged here within a surrounding framework, where the proposed height adjustment in this frame provides the desired fine tuning of the frequency, since the height adjustment causes a physical change in the length of the virtual pendulum. Apart from the fact that the entire device is relatively bulky and should still cause space problems in some areas of the wind turbine, the change or adaptation of the frequency by raising or lowering the heavy absorber mass, which can be about 500-5000 kg in the case of a wind turbine, is, however, quite difficult to achieve.

The object is therefore to provide a vibration absorber, in particular for damping resonant frequencies below 5 HZ, in particular below 1 Hz, in wind turbines or similar tall and slim installations or buildings, which is suitable for the restricted available space and meets the requirements of simple adjustability and adaptability of the resonant frequency to the local and operational conditions of an installation of this type taking into account the relatively heavy absorber masses required.

The object has been achieved by the vibration absorber described below. It has been found here that the vibration absorber according to the invention can be made available in various embodiments owing to its general novel concept, enabling most of the low-frequency vibration events, as summarised briefly above, occurring in a wind turbine or similar installation to be successfully damped or eliminated entirely.

SUMMARY OF THE INVENTION

The invention thus relates to a vibration absorber which can be matched variably to an interfering frequency and which is suitable, in particular, for wind turbines or installations and machines having similar vibration properties, or tall slim buildings, and which has running gear (1), an absorber main mass (1.1) and a running device (7), which is attached to a retention construction (3) or is part thereof, where the absorber main mass is mounted on the running gear or is an integral part thereof, and the running device is essentially curved in a concave manner and circular, at least in its central region, and the running gear (1) or the absorber main mass (1.1) can be moved and displaced out of a central position or vertex position on the concave side of this running device by means of wheels or rollers or in a non-contact manner in accordance with the vibration forces initiating the movements and effective in the direction of the running device, where, in accordance with the invention, the running gear (1) or the absorber main mass (1.1) (30.6) has at least one driven, disc-shaped, rotationally symmetrical rotation mass component (1.5)(1.6)(30.7)(30.8) having an axis of rotation perpendicular to the plane of the curved track of the running device, which moves together with the absorber main mass, and the direction of rotation corresponds to the respective direction of the moved running gear along the running device, where the at least one rotation mass component has a variable rotating mass (1.6)(30.7)(30.8) which corresponds to 1%-30% of the absorber main mass, depending on the diameter of the rotating mass or on the diameter of the mass centre of gravity of the mass part.

The use of an absorber of this type makes it possible in accordance with the invention to carry out a frequency change of the resonant vibration by up to 30%, preferably up to 20%, in particular up to 10 or 15%, depending on the selected rotation mass or moment of inertia and other design features of this rotating mass.

In accordance with the invention, the running device (7) comprises at least one preferably two or three, correspondingly shaped running rails (4) or running tubes (70), which are arranged in such a way that the running gear (1) including the two masses can move in a linear manner in a selected direction (depending on the force direction acting), where the running gear is fitted with corresponding wheels or rollers (1.2) which run on the rails, which are preferably arranged parallel in the direction of movement of the running gear.

The running gears for the vibration absorber according to the invention can in principle also be magnetically mounted, so that rollers can also be omitted or the rollers are only necessary in the event of failure of the magnet system. The rolling moment cannot be transmitted via the drive rollers with the magnetic system, so that additional systems, such as toothed racks or pull chains, are necessary. With toothed racks or pull chains, significantly higher torques, which are independent of the friction force, can be transmitted to the flywheel. Owing to the smaller driving pinions, which transmit the torque independently of the contact force, greater speeds of rotation of the flywheel can thus be achieved even without additional step-up gears. In turn, smaller rotation masses are thus necessary, or a broader frequency adjustment range is possible.

In a preferred embodiment of the invention, at least two running wheels (1.2) (80.3) (91) arranged one behind the other run on a rail, while at least one third wheel is positioned on the second rail running parallel in the direction of movement, and in general serves as drive wheel (1.3) for the rotation mass component (1.5)(1.6), to which it is connected via a shaft.

Alternatively, the running device (7) may, instead of a running rail (4), also be a round running tube (70), on which the running gear with at least three, preferably four, wheels or rollers distributed around the tube is moved, where the wheels or rollers have a concave running surface corresponding to the tube profile, which prevents the wheels from sliding off. In this embodiment, the wheels should be pressed onto the running tube with a certain contact pressure, which can be achieved, inter alia, by corresponding tensioning means. Also in this alternative embodiment, which is suitable, in particular, if very little space is available, at least one of the wheels is a drive wheel, which is connected to the rotation mass component via a drive axle.

For secure guiding and support of the running gear with rotation mass, it is possible, in a further embodiment of the invention, if the space requirement allows it, to provide a further rail (5) or a further tube, which is arranged above or below the running rail (4), preferably above, and on which a supporting wheel, which is connected to the running gear, is able to run. However, the running rail (4) may also be designed as an L element, on whose vertical, preferably low-friction surface the running wheel (1.3) can support itself. However, the horizontal running rail (4) may also be a support and guide rail (5) (80.5) which is separate therefrom and is arranged perpendicularly thereto.

For support and secure retention on the running device, additional transverse support wheels or rollers (1.7) may be present, which roll on the same running rails or on the same running tube, preferably perpendicularly to the axle of the running wheels (1.2)(1.3), and support the device at the side.

As stated, the running device of the absorber according to the invention has, at least in the central region, a curved shape, preferably in the form of curved rails or running tubes running essentially parallel to the direction of movement of the running gear (1) and substantially corresponding to the circle shape. The running device may also be substantially linear or have a hyperbolic shape, in particular in its two end sections. The running profile may also be circular with a different radius at the end than in the central region. It is also possible for the running device to have running rails or running tubes which have a different curvature. This is advantageous or even necessary if running and/or drive wheels of different size are to be employed, for example in order further to influence the frequency adjustment of the absorber.

The length of the running device over which the running gear with the absorber main mass and the rotation mass can move by, rolling can be adapted to the space necessities in the installation. For wind turbines, it has been found that a length of 2 m to about 5 m is the most suitable, preferably between 3 to 4 m. The two other dimensions can come out significantly smaller. The diameter of the rotation mass for an absorber of this size can be selected approximately between 0.25 m and 0.75 m, although diameters >0.75 m can also be employed. An absorber having such dimensions can in principle be installed not only in the tower of a wind turbine, but also on the inside or outside of the nacelle.

In general, it is possible in accordance with the invention for the running gear to be fitted with a plurality of drive wheels (1.3) and thus also a plurality of rotating flywheel masses, in particular two flywheel masses or rotation mass components. By variation of the size or diameter of the drive wheel rotating on the running rail or running tube, the speed of rotation of the wheel and thus also the speed of rotation of the flywheel connected thereto and of the rotation mass can be influenced, in turn enabling the absorber frequency to be varied.

It is also possible in accordance with the invention to increase the speed of rotation of the flywheel by a multiple compared with the drive wheel by installation of a gearbox (10.1). The invention thus also relates to a corresponding vibration absorber in which a gearbox is installed between drive wheel (1.3) and rotation mass unit (1.5)(1.6)(30.7)(30.8), so that the speed of rotation of the rotation mass unit is greater than that of the drive wheel. It is furthermore also possible to drive the drive wheel (1.3) and thus the flywheel (1.5) of the rotation mass component or the flywheel (1.5) itself actively by a motor.

The forces to be applied during movement of the rotation mass unit according to the invention are transmitted to the running device (rails or tubes) by friction of the rollers or wheels. Thus, it may occur, in particular in the case of damp, oily or iced running device or iced, damp or oily wheels or rollers, that the wheels, in particular the drive wheel, spin or slip on the running rails or running tube. The maximum possible damping and frequency adjustment of the damper is thus limited by the rotation flywheel mass. This can be prevented in accordance with the invention by the following embodiments: (i) the rollers/wheels, in particular the drive wheel, are/is made from a material or coated with a material that has a high friction value against the running device; (ii) the drive wheel may be tensioned against the running device in such a way that the rolling properties of the device are not crucially influenced; (iii) the running surface of the rails or tubes have a toothed belt profile on which corresponding wheels or rollers run, whose running surface itself have a corresponding profile, in such a way that the teeth of the wheels or rollers fit into the teeth of the running surface of the running device.

In accordance with the invention, the rotation mass component comprises a flywheel (1.5)(10.3), which preferably consists of light material, such as plastic or aluminium, and has a central shaft or axle, by means of which it is connected to the running gear on one side via a drive wheel. The rotation mass (1.6), which rotates in the same direction as the flywheel, is located on the other side. The axle or shaft of the flywheel and thus of the rotation mass is oriented in such a way that the plane of the wheel is arranged substantially parallel to the other running wheels on the rails or running tube, so that, in the optimum case, the direction of rotation of the rotation mass corresponds to the direction of the running device and thus the direction of the running gear.

The rotation mass may consist of one mass disc, but also of a plurality of discs, which are mounted on the shaft or axle in accordance with the requisite frequency adaptation.

In general, the frequency can be changed, inter alia, by the following measures merely on the flywheel: (i) size of the mass, (ii) position of the mass or centre of gravity of the mass on the axle: the moment of inertia of the mass thus changes when the mass is pushed radially outwards or inwards, (iii) position of the mass or centre of gravity of the mass in relation to the diameter of the rotating component and (iv) length and curvature of the running device.

According to a preferred embodiment of the invention, the centre of gravity of the mass (10.4) is displaced radially inwards or outwards by means of a displacement device (10.4.1), which leads to a change in the moment of inertia of the mass, in turn enabling the resonant frequency to be influenced. In a simpler variant, mass discs of larger or smaller diameter (with the same total rotation mass) can simply be mounted on the flywheel.

In a further embodiment of the invention, additional damping of the system may be appropriate in addition to the damping by the mass flywheel. Thus, for example by means of the vortex flow principle known per se, (i) damping can be achieved in the rotating region of the flywheel or (ii) damping can be achieved in the region of the running wheels in connection with the rail/tube arrangement, as described in greater detail below.

A preferred embodiments of the absorber according to the invention comprises (i) a running device (7) comprising two running rails (4) run in parallel in the direction of movement, (ii) two free-running running wheels (1.2) arranged one behind the other, which run on the first running rail (4), and (iii) a drive wheel (1.3), which is arranged on the second running rail (4) opposite the two free running wheels and (iv) is connected to an outward-facing flywheel (1.5) having at least one mass disc (1.6), where drive wheel and running wheels as well as absorber main mass are parts of the running gear (1).

Another embodiments of the absorber according to the invention comprises:
(i) a running device comprising a round tube (70),
(ii) two drive wheels (70.1) arranged one behind the other, which each drive a rotation mass component (1.5)(1.6),
(iii) two further running wheels (70.2) arranged one behind the other, which are arranged opposite the drive wheels (70.1), and
(iv) at least two opposite, supporting transverse wheels, which are arranged perpendicular to the plane of the drive wheels,
where all wheels and have a running surface shaped in a concave manner in accordance with the tube curvature, by means of which they can be moved to and fro on the tube, and where the wheels and their bearings are tensioned against one another by corresponding tensioning means, so that functionally perfect movement of the running gear (1) on the tube, including the absorber main mass (1.1), is ensured.

Since the absorber according to the invention is only effective in one vibration direction, i.e. only in a linear manner, it is necessary to provide at least two such vibration absorbers which are effective in different directions, preferably 90° to one another, for vibrations in a plane. The invention thus also relates to a vibration absorber arrangement for damping excitation vibrations from two or more different directions, comprising two or more vibration absorbers according to the invention, where at least two vibration absorbers are positioned in different directions, with respect to the alignment of their running direction, in the installation to be damped. In a preferred embodiment of an arrangement of this type, two vibration absorbers according to the invention are physically combined, or connected, to one another.

The invention thus also relates to a corresponding vibration absorber arrangement for damping excitation vibrations from two different directions, which comprises the following features:

(i) a first lower vibration absorber having a running gear (30.5) an absorber main mass (30.6) and a rotation mass (30.8) which are moved on the running/retention device (30.4), and (ii) a second upper vibration absorber having a running gear (30.1) and a rotation mass (30.7) which are moved on the running/retention device (30.3), but without its own absorber main mass, where the lower and upper vibration absorbers form an angle to one another with respect to their running devices, and the first lower vibration absorber is connected to the running gear (30.1) of the second upper vibration absorber by means of a connecting element (30.2) attached to its running/retention device and is thus suspended freely on this upper running gear (30.1) and is moved with the latter in the direction of the running device (30.3) of the upper vibration absorber, including the absorber main mass (30.6), while the running gear (30.5) of the lower vibration absorber, including the same absorber main mass (30.6), can be moved simultaneously in the direction of its own, different running device (30.4), in accordance with the effective interfering vibrations occurring in the two different directions.

The vibration absorbers and arrangements of vibration absorbers according to the invention are eminently suitable for damping vibrations below 5 Hz, in particular <1 Hz, in particular <0.5 Hz, preferably between 0.1 and 0.25. The invention thus also relates to the use of a corresponding vibration absorber or an arrangement of vibration absorbers for damping interfering vibrations between 5 Hz and 0.1 Hz, preferably between 0.25 Hz and 1 Hz. The frequency can be changed by about 10-35%, in particular by about 20-30%, it being possible to carry out the frequency adjustment very precisely and in small steps. This adjustment of the frequency, or adaptation thereof to the specific vibration conditions can significantly more simply and accurately than, for example, with the absorber which is known from JP 08-200438 (A) or EP 2746483 (A1). In addition, it is easier to install at a very wide variety of locations (nacelle, tower) in the installation. The corresponding frequency changes only require small masses, which are about ¹/₂₀ to ¼, preferably about ¹/₁₀ of the swinging main mass, which is a significant advantage over comparable vibration absorbers of the prior art.

Thus, the frequency of a swinging main mass of 250 kg can be changed by 20-30% using a rotation mass of around 65 kg with a diameter of 0.25 m in the case of a length of the running device of 2.5 m-3.5 m. The same effect only requires a rotation mass of around 15 kg in the case of a diameter of the rotation mass of 0.5 m and a rotation mass of about 7 kg in the case of a diameter of 0.75 m. Furthermore, the frequency of a swinging main mass of 500 kg can be changed by 20-30% with a rotation mass of around 130 kg with a diameter of 0.25 m in the case of a length of the running device of 2.5 m-3.5 m. The same effect only requires a rotation mass of 30 kg in the case of a diameter of the rotation mass of 0.5 m and a rotation mass of about 15 kg in the case of a diameter of 0.75 m. Furthermore, the frequency of a swinging main mass of 1000 kg can be changed by 20-30% with a rotation mass of around 250 kg with a diameter of 0.25 m in the case of a length of the running device of 2.5 m-3.5 m. The same effect only requires a rotation mass of around 65 kg in the case of a diameter of the rotation mass of 0.5 m and a rotation mass of about 30 kg in the case of a diameter of 0.75 m.

Finally, the emission also relates to a wind turbine which has at least one vibration absorber or at least one arrangement of vibration absorbers as described.

The basic idea of the absorber system described here is to facilitate small masses through large swing distances. Whereas vibration absorbers in previous towers achieve swing distances of about only 300-500 mm, swing distances of more than 3000-5000 mm can be achieved with the absorber described. This would mean that, for about 10 times the swing distance, the requisite mass can be reduced to about ¹/₁₀, which is an advantage per se. However, such lightweight absorbers must be matched to the resonant frequency of the tower in a very accurate ratio. This is possible with the invention described.

BRIEF DESCRIPTION OF THE DRAWINGS

The invention is described below in detail with reference to the figures.

FIGS. 2A and 2B respectively show an end view of FIG. 1A and a cross sectional view along section line 2B-2B of FIG. 1A.

FIGS. 8A, 8B and 8D respectively show top, perspective and perspective views a system of combined vibration absorbers in which two running devices/retention devices are arranged crossed over, preferably at a 90° angle while FIG. 8C is a partial enlarged perspective view of an area of FIG. 8D.

FIGS. 9A, 9B and 9C respectively show bottom, front and top views for additional damping in the rotating region of the flywheel.

FIG. 9D is a cross sectional view along section line 9D-9D in FIG. 9B.

FIG. 9E shows an enlargement of the area shown in FIG. 9C.

FIG. 9G shows an enlargement of the area shown in FIG. 9F.

FIGS. 10A-10D show, in contrast to the classical pendulum absorbers, new embodiments for positioning and arranging the absorber in the installation to be damped.

FIGS. 13A and 13B respectively show front and perspective views of a vibration absorber, according to the invention, which a round running tube with running gear and in the specific case two rotation masses, running wheels and support wheels.

FIG. 13C is a cross sectional view along section line 13C-13C in FIG. 13A.

FIGS. 14A and 14B respectively show front and perspective views of a vibration absorber, according to the invention, which a round running tube with running gear and in the specific case two rotation masses, running wheels and support wheels.

FIG. 14C is a cross sectional view along section line 14C-14C in FIG. 14A.

FIG. 15A shows top view with additional damping with maximum deflection of the swing mass, in the region of the running wheels (rail arrangement), to facilitate variable damping over the swing path of the absorber mass, and Eddy current damping can also be accomplished via the running wheels.

FIGS. 15B and 15C respective show is a cross sectional view along section lines 15B-15B and 15C-15C in FIG. 15A.

FIG. 15D is a perspective view of a running or drive wheel.

FIG. 16A shows top view with additional damping with smaller deflection of the swing mass, in the region of the running wheels (rail arrangement), to facilitate variable damping over the swing path of the absorber mass, and Eddy current damping can also be accomplished via the running wheels.

FIGS. 16B and 16C respective show is a cross sectional view along section lines 16B-16B and 16C-16C in FIG. 16A.

FIG. 17A shows the running surfaces of at least some of the wheels and running rails involved are either coated with a stiff plastic having a low temperature-dependent coefficient of expansion or, alternatively, have a toothed profile or toothed belt profile provided with cams or a flat contact surface.

FIG. 17B shows an enlargement of the area shown in FIG. 17A.

DETAILED DESCRIPTION OF THE PREFERRED EMBODIMENTS

Figure 3A:
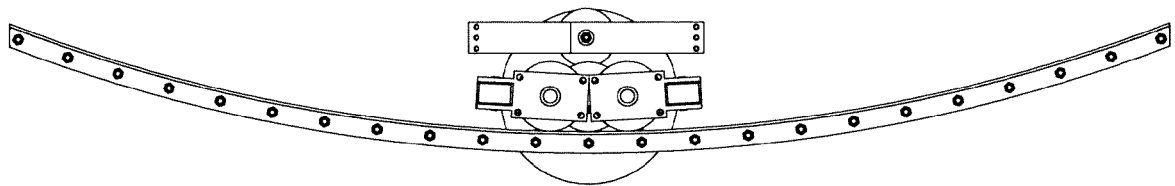
FIGS. 3A-3C respectively show front, perspective, and front views of installations of transverse support rollers provided for lateral support.
Figure 3B:
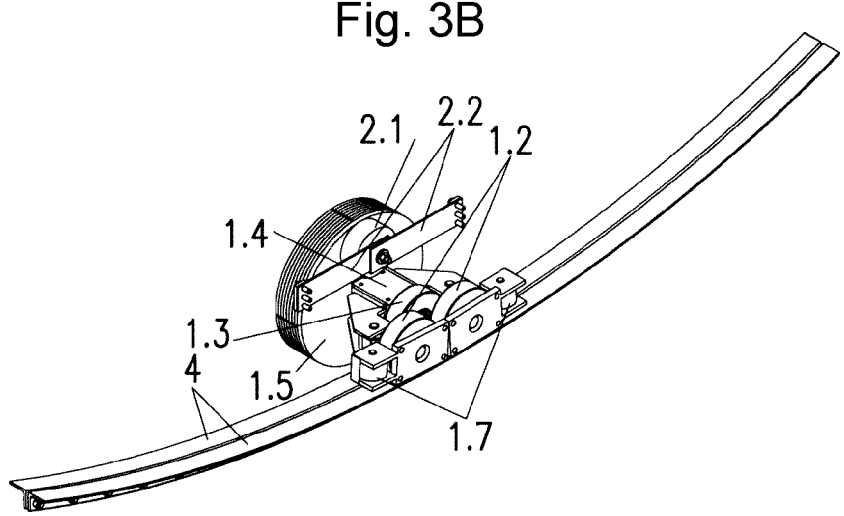
Figure 3C:
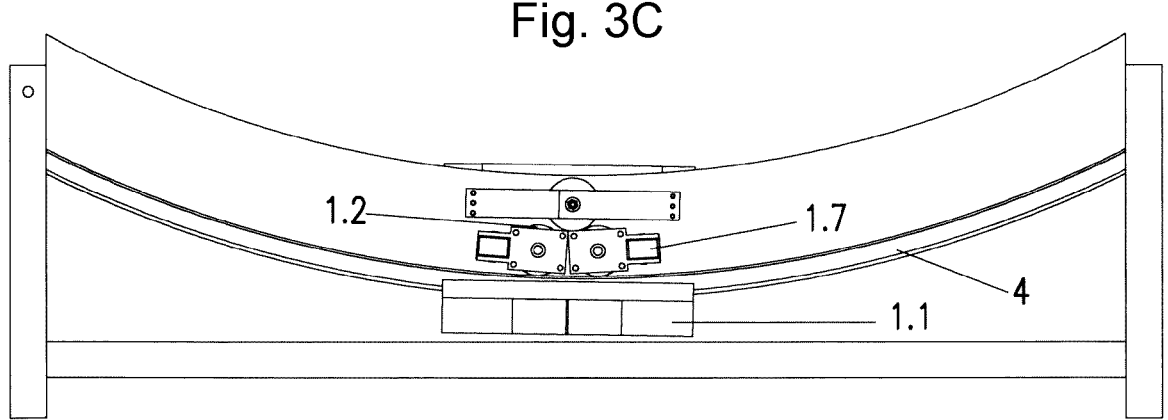
Figure 4A:
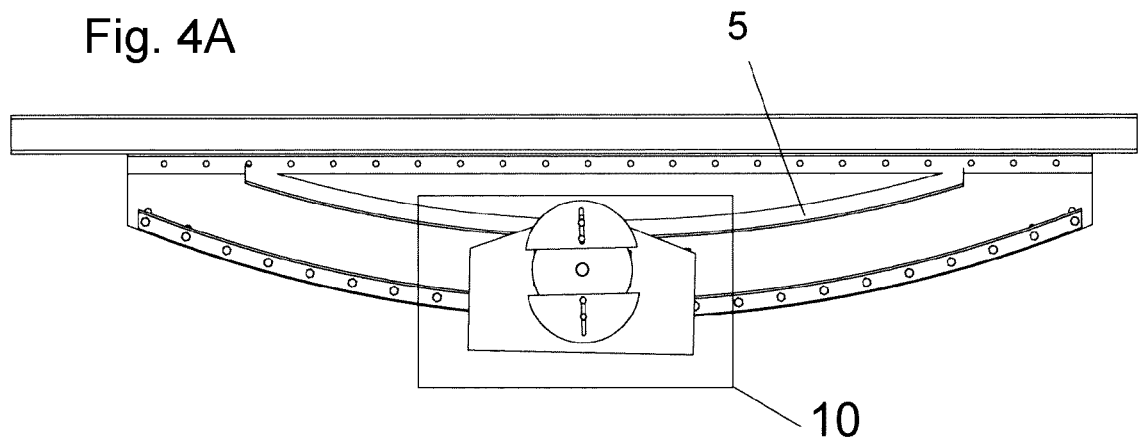
FIGS. 4A, 4B and 4D respectively show front, rear and perspective views of a gearbox so that the speed of rotation of the rotation flywheel mass becomes as high as possible.
Figure 4B:
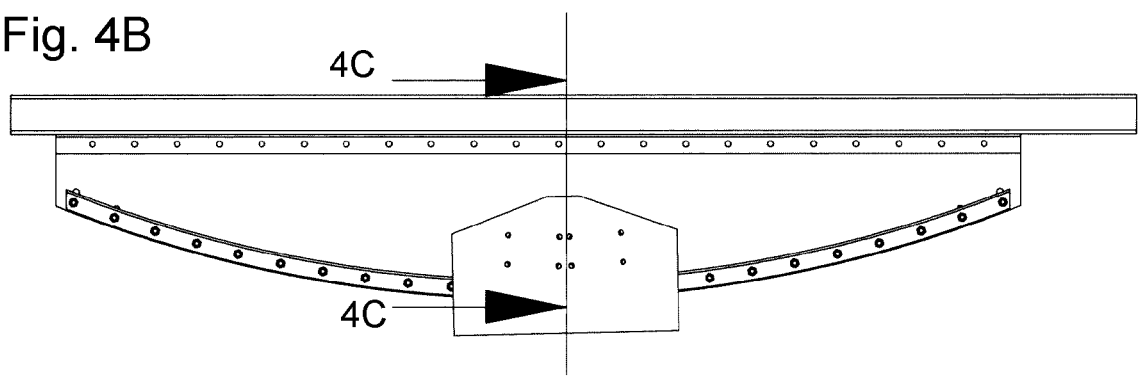
Figure 4C:
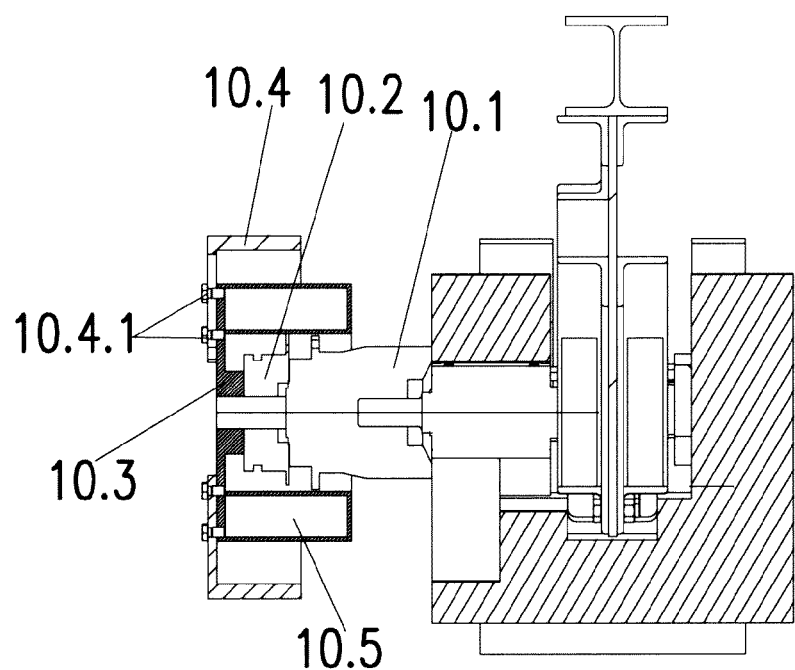
FIG. 4C is a cross sectional view along section line 4C-4C of FIG. 4B.
Figure 4D:
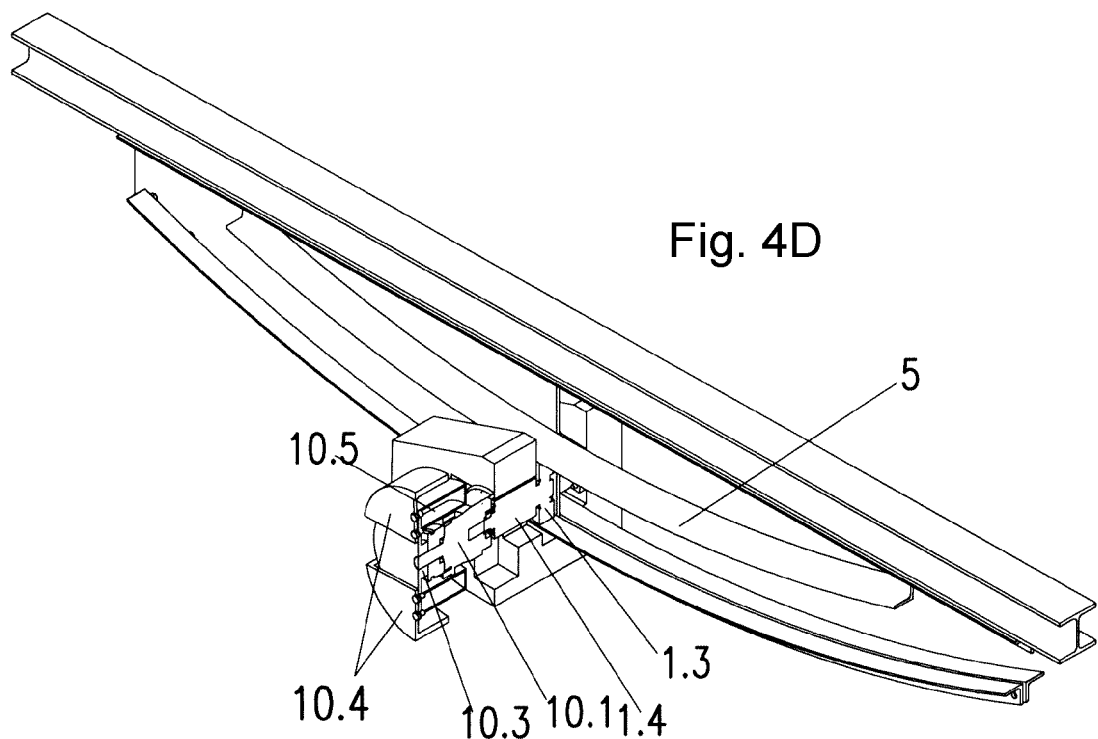

FIGS. 1-3 show the roller absorber according to the invention from various arrangements and positions.

Figure 1A:
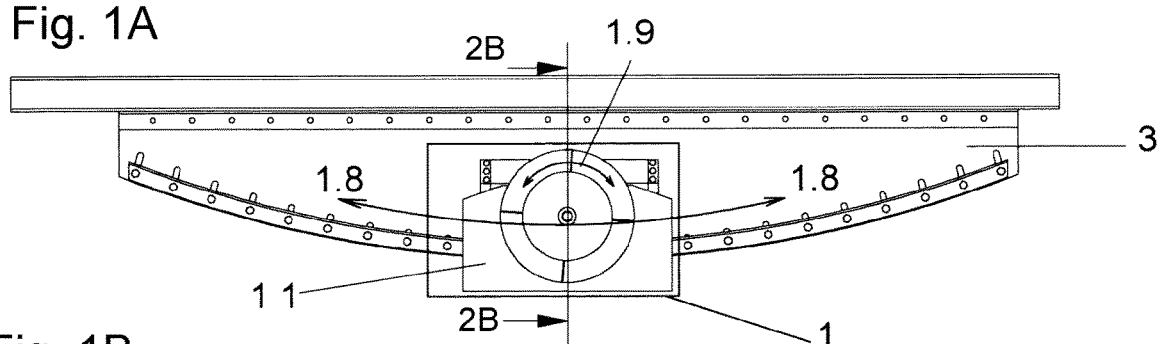
FIGS. 1A-1C respectively show front, rear and perspective views of a roller absorber which consists of the entire movable part, which rolls on an arc-shaped running track and thus moves a circular movement, similar to a pendulum deflected on one side.
Figure 1B:
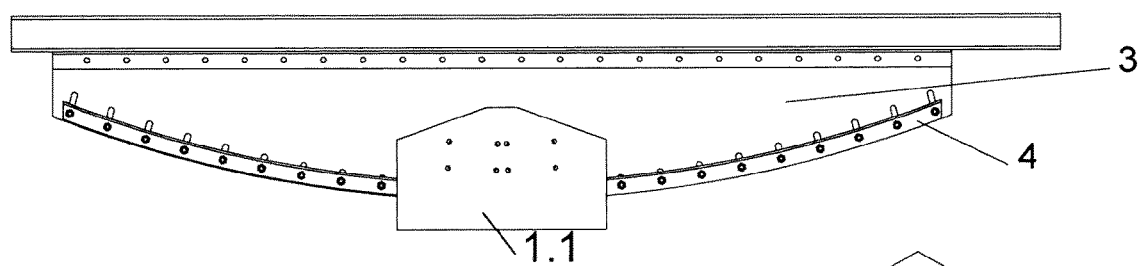
Figure 1C:
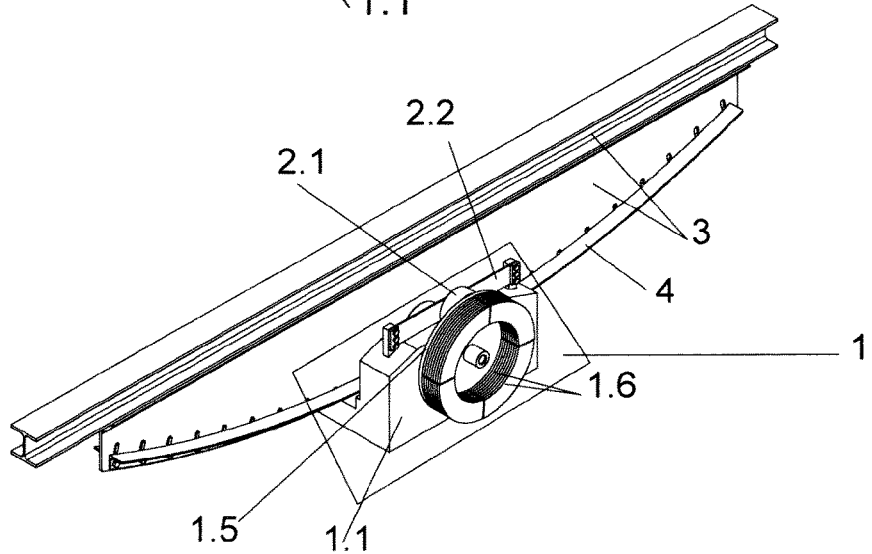

FIG. 1(a)-(c) shows a roller absorber which consists of the entire movable part, which rolls on an arc-shaped running track and thus moves a circular movement, similar to a pendulum deflected on one side. The movable running gear (1) is moved on at least three running rollers. For lateral support, transverse support rollers (1.7) are installed (FIG. 3). The running rails (4) are connected to the retention construction (3). Holes may be installed for adjustment. A rotating mass (flywheel 1.5) driven by the running roller is installed on at least one of the running rollers. On circular movement of the movable part (1) in the movement direction (1.8), the flywheel rotates in direction (1.9). The rotation mass of the flywheel influences the resonant frequency of the absorber. Different flywheel mass thus enables the resonant frequency of the absorber to be adjusted precisely to the requisite values.

For certain use aims, it may be necessary to fix the absorber during operation of the installation. Besides mechanical systems, this can be carried out by an electromagnetic brake. In a further embodiment of the invention, the absorber comprises a parking brake (2), in the case of which it is ensured that this is released at standstill of the installation. To this end, an electromagnet (2.1) is attached to at least one or also several leaf springs in such a way that it is able to move axially. So long as the magnet is without current, it is held by the leaf springs (2.2). If it is charged with current, it moves towards the flywheel disc and brakes the latter. Since the flywheel disc has a higher speed and thus smaller portion forces on the outer diameter than the absorber itself, relatively small magnets are sufficient for the braking. Alternatively, the magnet may also act as retention construction on another movable part (1).

The size of the flywheel mass increases with increasing mass, and with increasing radius on which the mass acts. The effect on the absorber frequency increases with increasing flywheel mass and with increasing rotational speed squared. In the first approach, the largest possible flywheel is therefore driven with the smallest possible roller, so that the flywheel mass and especially the rotational speed are as great as possible.

The adjustment of the resonant frequency of the absorber is carried out by attaching more or less mass to the flywheel. At the same time, it is also possible to influence the resonant frequency by displacing the flywheel mass (1.6) radially. It is important that the friction of the wheel is sufficient to drive the mass with the corresponding acceleration. It is advantageous here that, in the case of the three-wheel arrangement, the flywheel mass is attached to one of the three wheels, so that half of the mass acts on one wheel. At the same time, the load on this drive wheel (1.3) increases with increasing flywheel mass, which at the same time helps to drive the greater flywheel mass with a constant friction factor. With this method, the resonant frequency of the absorber can be adjusted by 10% to 30%.

The moment of inertia of the flywheel mass (1.6) is defined by mass×distance squared. [kg×mm$^2$]. Owing to the maximum drive force, which is dependent on the weight of the swinging mass and the possible friction values between drive wheel and rail, the maximum flywheel moment and thus the size of the flywheel mass 1.6 with flywheel 1.5 is limited. A drive wheel having a greater radius can also drive a correspondingly greater flywheel moment, but results in a lower rotational speed. For example, in the case of a 0.25 Hz absorber system with a radius of the drive wheel of 100 mm, a total rotation mass (1.6) of about 5000 kg×mm$^2$ can be driven per kg of absorber main mass (1.1) with the system described—with half the load on the drive wheel (1.3). The frequency can thus be influenced between 10 and 30%, in particular by about 20%. In the case of a diameter of the flywheel mass of, for example, 450 mm, this gives a rotating mass of about 0.1 kg/kg of absorber weight. This means that, for example for frequency adjustment by 20%, about 10% of the absorber main mass (1.1) must rotate as rotation mass (1.6) with a diameter of 450 mm. By displacement of the centre of gravity of the swinging main mass (1.1) in the direction of the drive wheel, the load on the drive wheel (1.3) and thus the possible flywheel mass can be increased. A higher friction value between drive wheel and rail likewise has a positive effect here on the possible frequency spread. Since an adjustment range of +−5% is sufficient for adaptation of the usual frequency deviation of towers of the same design, the possible adjustments that can be achieved with the system are not fully exhausted.

The mass of the flywheel (1.5) is a fixed quantity which, although having to be driven by the friction between drive wheel (1.3) and rail/tube, does not, however, make a significant contribution to the adjustment range. The rotation mass (1.6) of the flywheel (1.5) should therefore be as small as possible. The flywheel (1.5) is preferably made from a light metal or plastic and is used for the greatest possible adjustment range. A further increase in the adjustment range is possible through the use of toothed racks, chains or toothed belts, which positively drive the drive wheel directly or indirectly.

A further possibility is, as depicted in FIG. 4, to use a gearbox (10.1), so that the speed of rotation of the rotation flywheel mass (1.6) becomes as high as possible. This enables the variable rotation mass to come out lower owing to the high speed of rotation. Thus, a transmission ratio of 5, for example, gives $5^2=25$ times the effect, i.e. for the same diameter only a 25th of the mass is required than would be necessary in the case of an ungeared flywheel disc. The variable mass can be displaced in the radius or diameter by means of a simple adjustment device (10.4.1). In the case of a fast-rotating system, it is of course possible to use a relatively small magnetic torsion brake (10.2). It is also readily possible to design the absorber to be active by incorporating electric motors. For frequency adjustment by 10-20%, only about 1% to 2% of the swinging mass would be necessary with a transmission ratio of 5 and a flywheel diameter of, for example, 200 mm. Since a gearbox is an additional component which has to be maintained, the simple flywheel disc, in spite of the greater flywheel mass required for setting the resonant frequency, has the advantage of a simple design and significantly reduced maintenance costs.

Figure 5A:
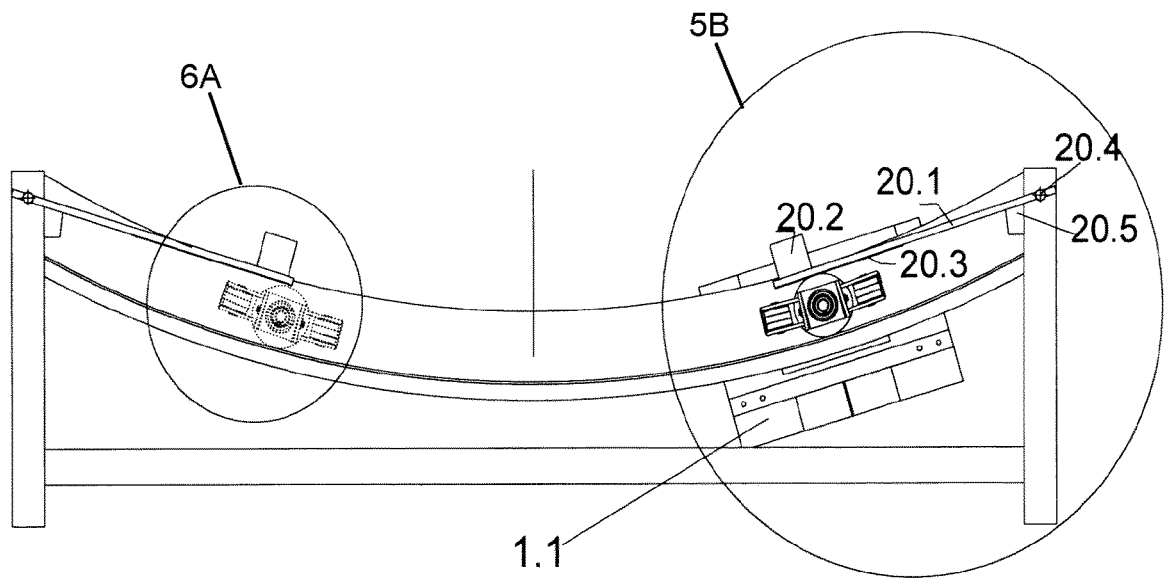
FIG. 5A shows a further embodiment with greater damping of strong swing movements where a friction damper is used as the absorber, which only becomes effective in the case of large deflections of the absorber.
Figure 5B:
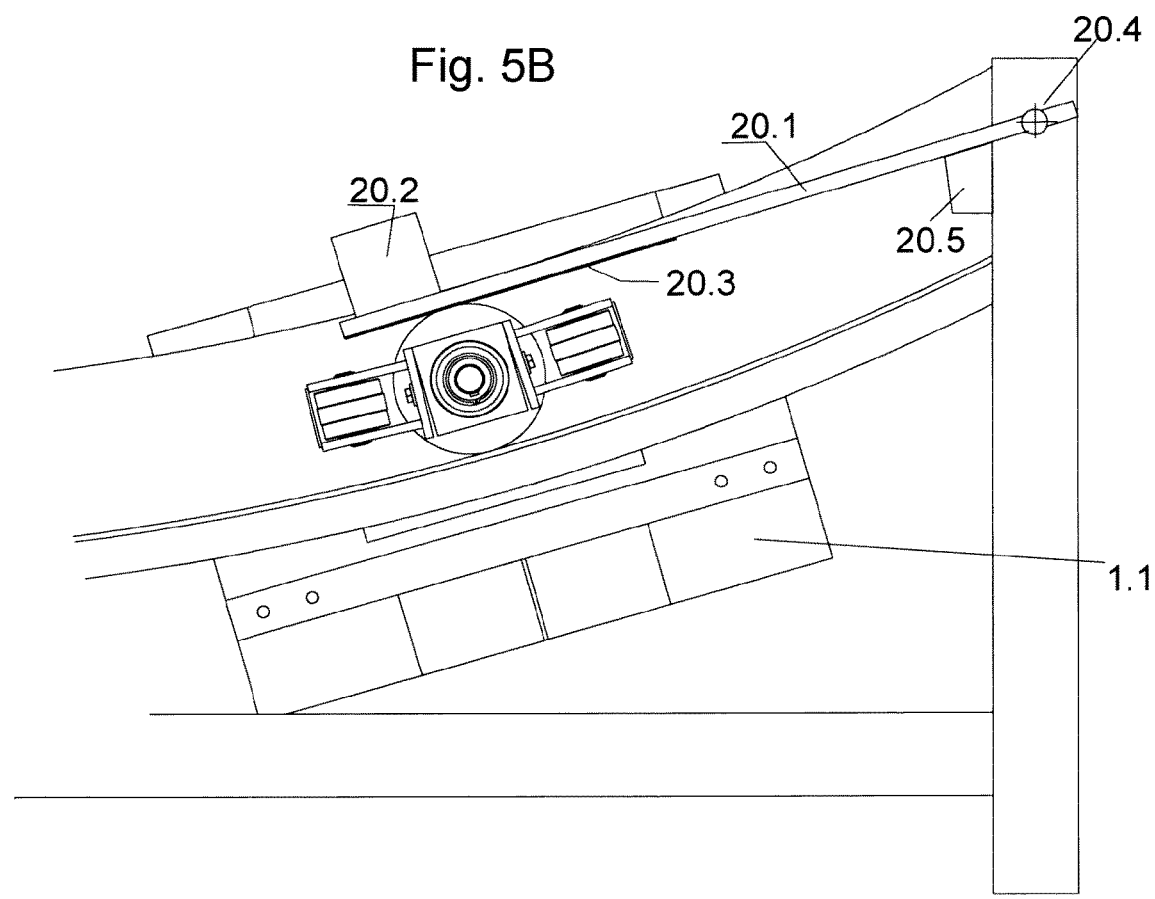
FIG. 5B shows an enlargement of area 5B in FIG. 5A.
Figure 6A:
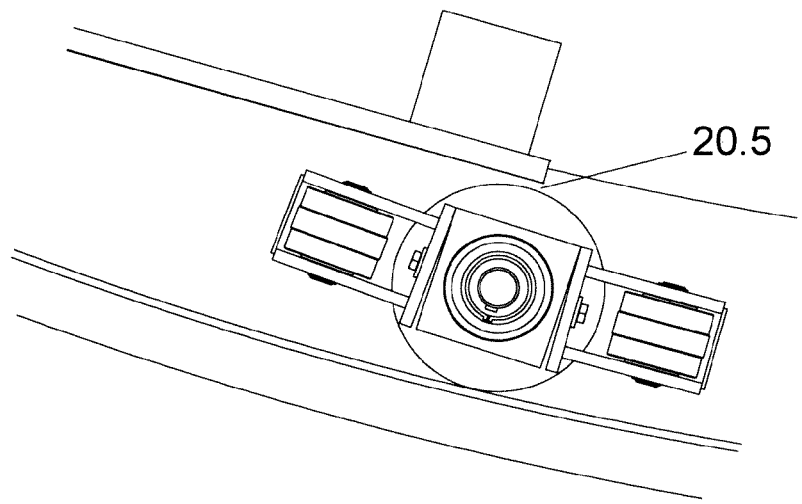
FIG. 6A shows an enlargement of area 6A in FIG. 5A.
Figure 6B:
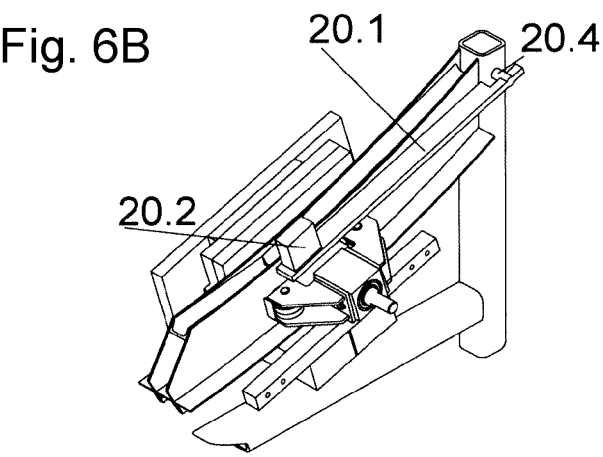
FIG. 6B shows a partial view of FIG. 6A.

Vibrations and impacts caused by unusual influences can load the absorber system to a greater extent than is usual in general operation. It is thus possible for the vibration absorber to be deflected to a greater extent than usually occurs in normal operation. In order to prevent impact of the absorber, an end position damper in accordance with the prior art can be employed. A simple further embodiment in accordance with the invention in connection with greater damping of strong swing movements of the absorber is the friction damper (20) described in FIGS. 5 and 6, which only becomes effective in the case of large deflections of the absorber. This friction damper comprises, for example, a lever (20.1), which is mounted in the joint (20.4) and is prevented from tilting downwards by the stop (20.5). The lever may contain an additional friction lining, with which it slides on at least one wheel in the case of relatively large amplitudes and brakes the latter. With increasing distance, the contact force of the lever on the wheel and thus the friction is increased owing to the geometric conditions and due to the effect of the mass (20.2). Progressive damping is thus possible. The fact that the mass (20.2) can be displaced on the longitudinal axis of the lever enables the damping of this system to be matched to the requirements. The lever is set by means of the stop (20.5) in such a way that a gap (20.6) is still present when the lever approaches, so that entry of the roller into the lever can take place continuously.

Figure 7:
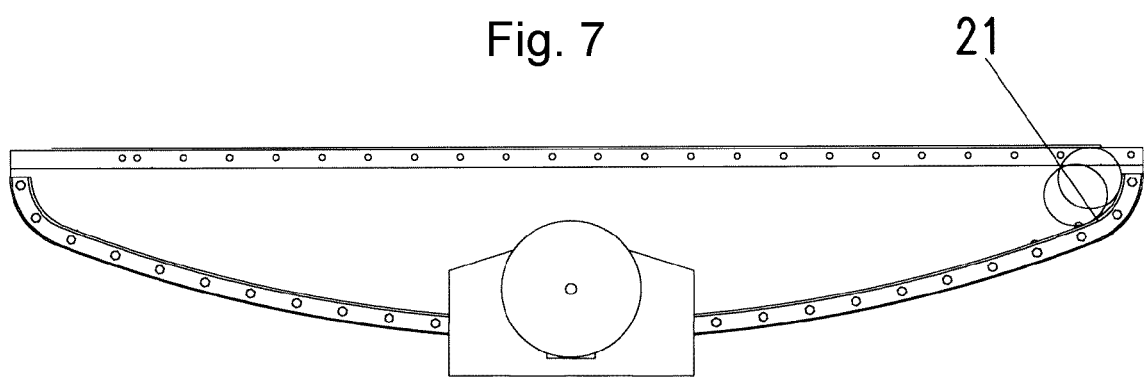
FIG. 7 shows a front view of a further embodiment for achieving a gentle or controllable end stop where the running rail is formed with an upward-facing curvature which becomes steeper.

A further possibility for achieving a gentle or controllable end stop is the formation of the running rail (4) with an upward-facing curvature (21) which becomes steeper, in accordance with FIG. 7. In principle, any curve run or any curve profile which guarantees rolling can be achieved, where the theoretically optimum shape is described by a rolling wheel curve (cycloid). However, this is very similar to the circular track in the case of the rolling radii proposed. A curve profile composed of straight and curved elements can also be used.

Figures 8A, 8B:
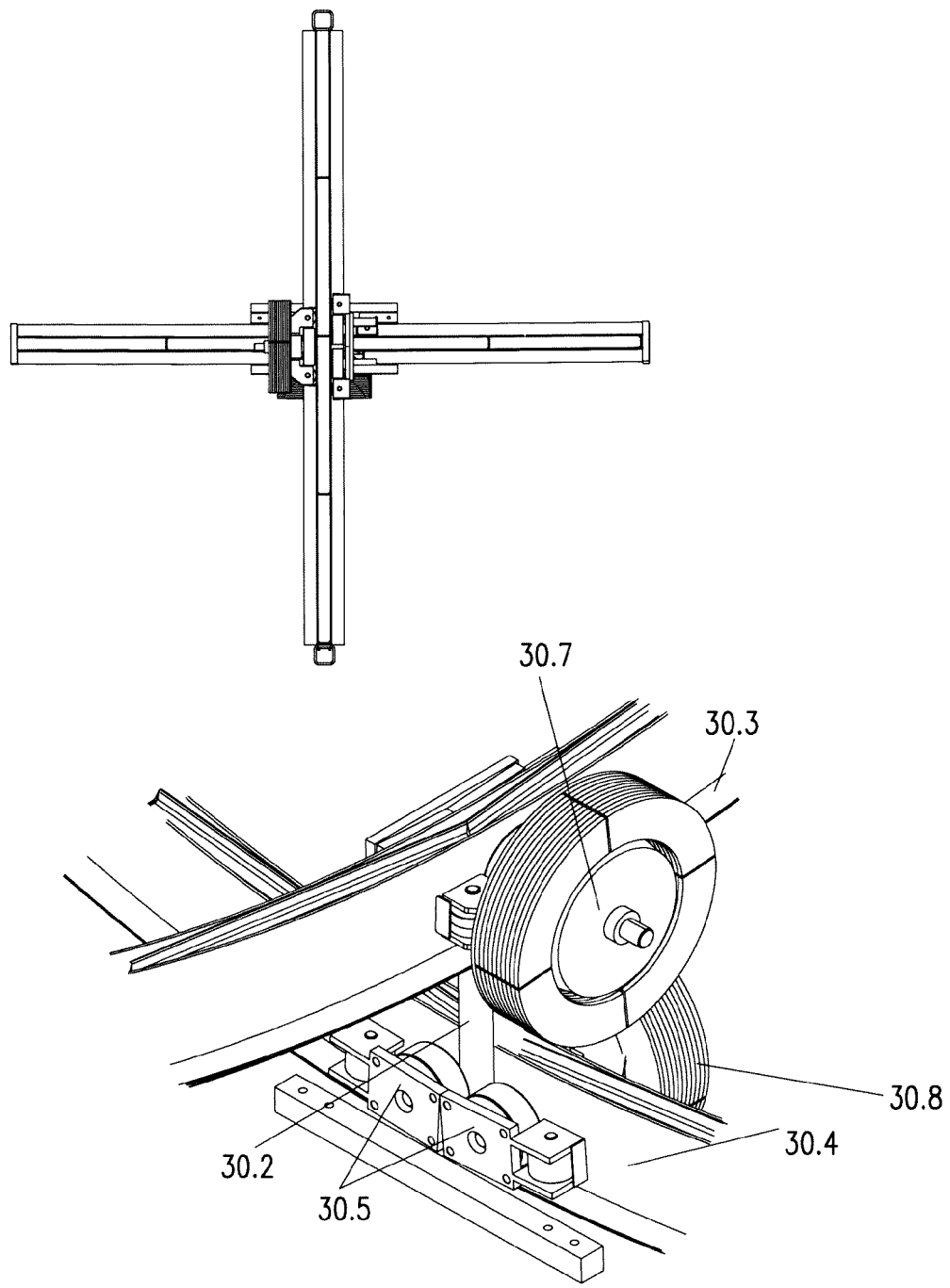
Figure 9A:
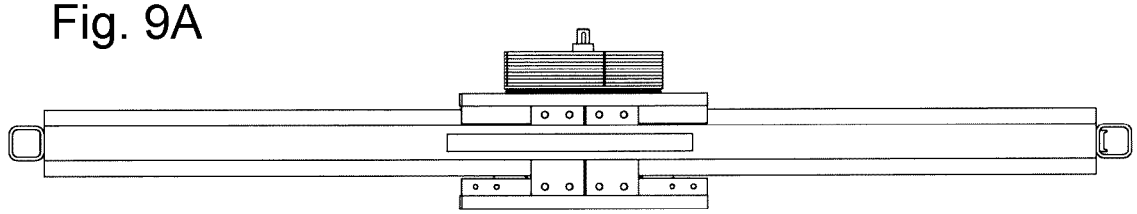
Figure 9B:
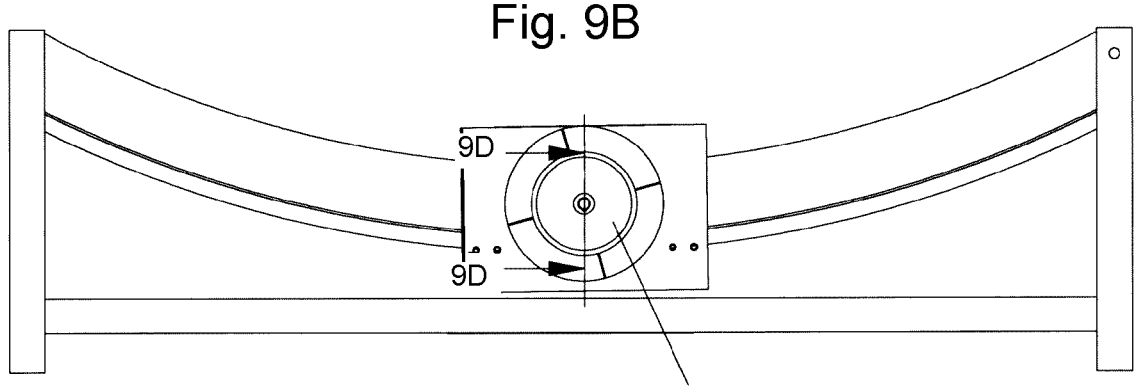
Figure 9B:
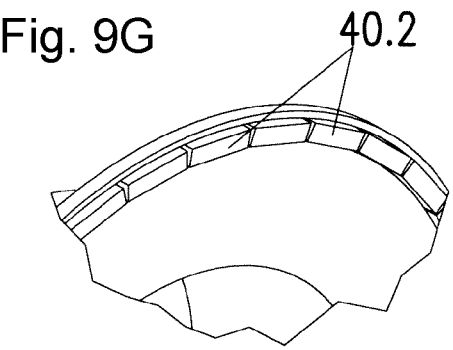
Figure 9F:
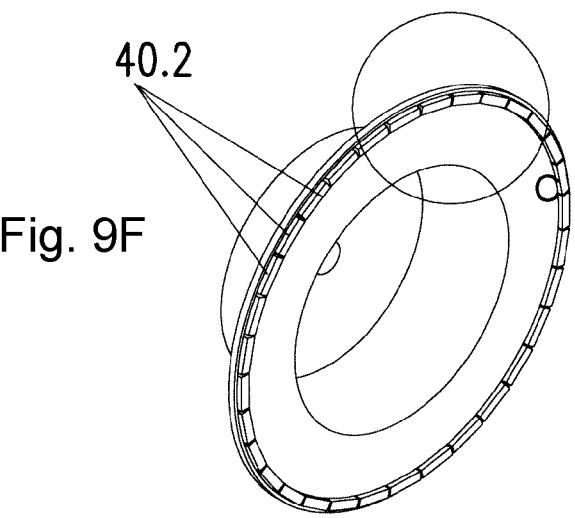
FIG. 9F shows a magnetic damper/Eddy current damper.

The vibration absorbers described to date only act in one direction, i.e. in a linear manner. In order to be able to operate the absorber in the entire plane of a swinging component, there is on the one hand the possibility of operating a plurality of separate absorbers (at least 2) in different directions (90° in the case of two absorbers) and to arrange them differently in an installation. FIG. 8 shows, for example, a system of combined vibration absorbers in which two running devices/retention devices are arranged crossed over, preferably at a 90° angle. The construction is such that a curved running rail (30.3) has only one running gear (30.1) without additional main mass. The flywheel (30.7) is also attached to this running gear. The running gear at the top (30.1) is connected to the retention construction at the bottom (30.4) by means of the connecting element 30.2. The running gear (30.5) with the main mass at the bottom (30.6) then runs on this retention construction (30.4). The mass at the bottom (30.6) thus acts in both directions. Owing to the previous low resonant frequencies and thus relatively small forces, a system of this type with the connecting element (30.2) can be constructed to be sufficiently stable. For stability, it is important that stable profiles, for example box profiles, are used.

As already mentioned, the radii of the running rails/running tubes running parallel to the movement may be different. Different radii of the running rails enable different frequencies to be set in different directions. Besides the ungeared flywheel mass depicted, it is of course also possible to employ the gearboxes already described and thus to use correspondingly lower flywheel masses.

Figure 10A:
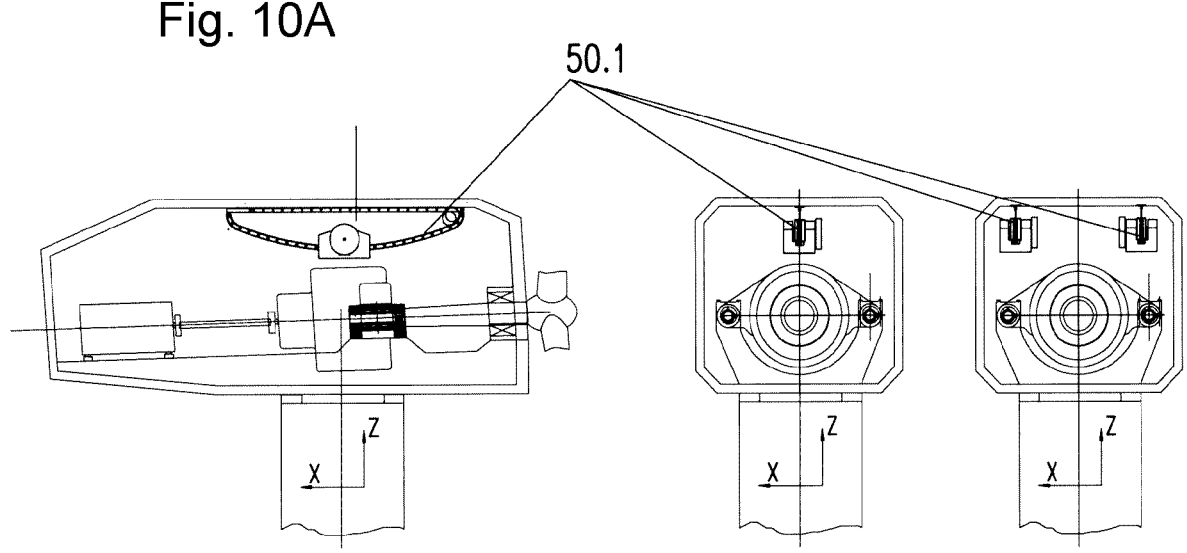
Figure 10B:
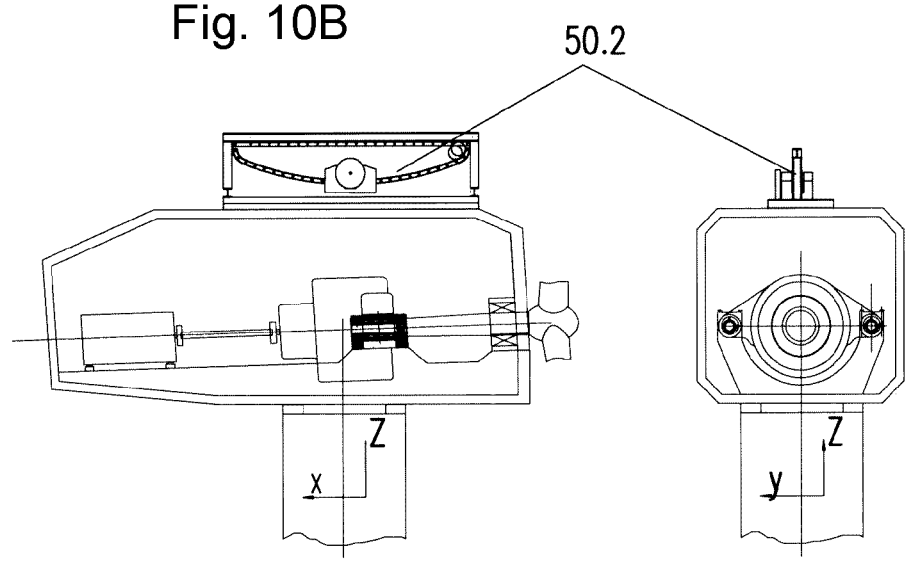

Owing to the elongated slim, but nevertheless fairly compact design of the absorber, new possibilities exist for positioning and arranging the absorber in the installation to be damped (FIG. 10), in contrast to the classical pendulum absorbers employed to date. It is thus obvious to install the absorber as far as possible towards the top in the wind turbine, since the greatest effect in damping the first tower resonant frequency is achieved there. Thus, the axially acting absorber can be positioned in the upper region of the nacelle. Depending on the space conditions, it is possible in accordance with the invention to employ one absorber centrally, one absorber eccentrically, or also a plurality of absorbers (50.1). The absorbers (50.2) can also be positioned on the generator nacelle. In addition, the absorbers can run outside in the open on the nacelle. Ideally, a housing is installed in the case of positioning on the nacelle, Today's nacelles have a width of more than 4 m, so that the absorbers can also be installed in the transverse direction in the nacelle. This also gives rise to the possibility of installing one absorber according to the invention transversely to the nacelle and one absorber longitudinally to the nacelle (50.4), or the absorber can accordingly be installed transversely on the nacelle (50.6) or also transversely inside the nacelle (50.7). It is also possible to install the absorber arrangement according to the invention with the crosswise arrangement (30) in the nacelle or on the nacelle.

Figure 11A:
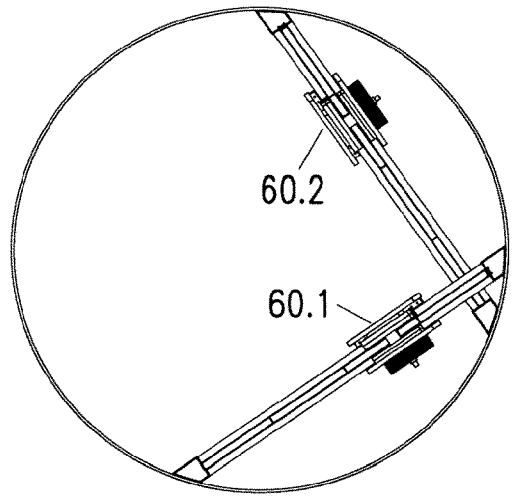
FIGS. 11A and 11B respectively show top and perspective views of individual linear absorbers which can, in accordance with the invention, be installed offset within the interior of the tower where sufficient space is present.
Figure 11B:
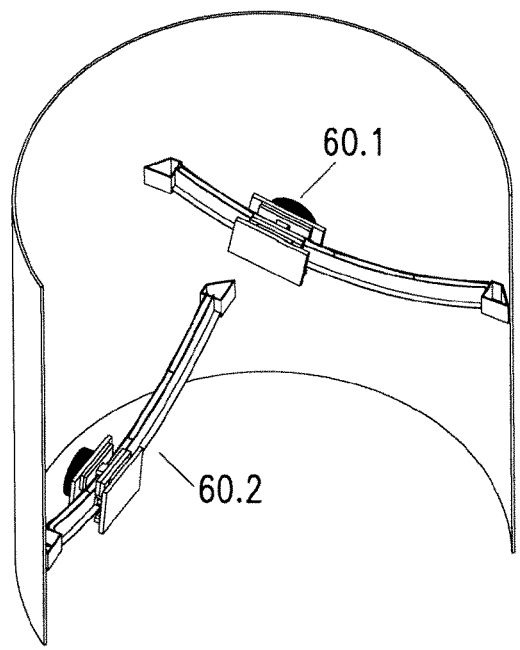

The absorber according to the invention is also eminently suitable for installation in the tower of the wind turbine, or in corresponding tall slim buildings, in order to damp the low-frequency vibrations of below 5 Hz, in particular below 1 Hz, there. Since the tower is direction-independent, one absorber must in all cases be provided for each of the two directions in the tower. This can take place in a plane. However, since further technical fittings, some of which require considerable space, are generally necessary in the tower of a wind turbine, individual linear absorbers can in accordance with the invention be installed offset in direction and height in the interior of the tower, where sufficient space is present, as depicted in FIG. 11.

Figure 12:
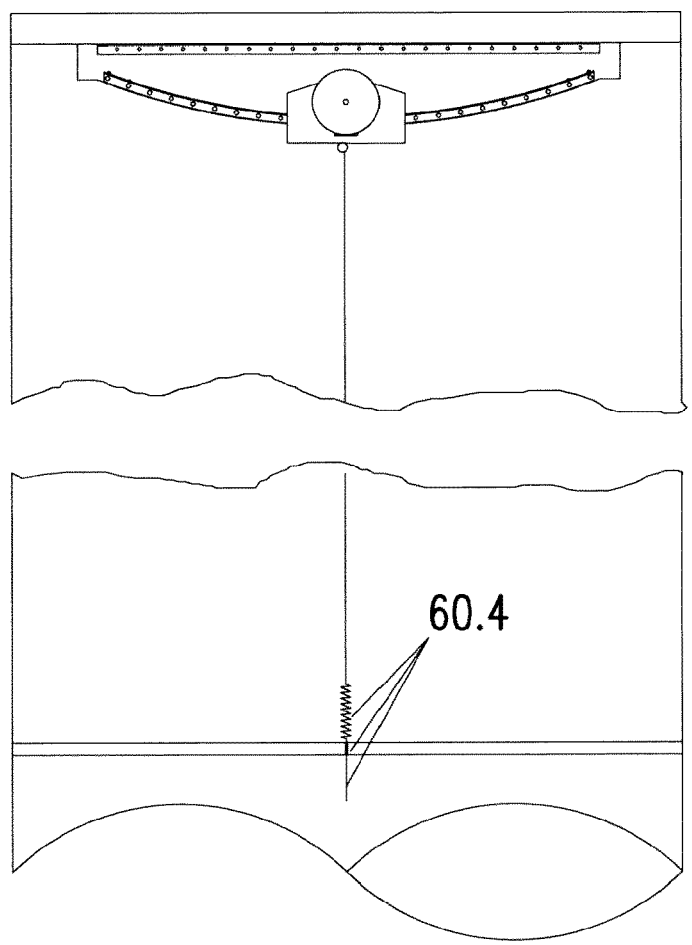
FIG. 12 shows a partial view of another embodiment where the absorber is additionally fitted with a vertical spring, which enables the frequency to be further influenced.

In another embodiment of the invention, the absorber according to the invention is, as shown in FIG. 12, additionally fitted with a vertical spring, which enables the frequency to be influenced further. To this end, a vertically acting spring (60.4) is attached or clamped, for example via a cable, to the absorber and to the building/tower base, or also to a wall, where the spring cable length should be at least twice the length of the swing distance. The length-adjustable steel spring (60.4) can then be tensioned to a greater or lesser extent, which influences the frequency of the absorber. It is also possible to combine frequency adjustment via the flywheel disc with frequency adjustment by the tensile spring.

FIGS. 13 and 14 depict vibration absorbers according to the invention which, instead of a running rail arrangement, as running device, a round running tube with running gear and in the specific case two rotation masses (1.5), running wheels (70.1)(70.2) and support wheels (70.3).

The vibration absorbers according to the invention can, as already mentioned above, also be additionally damped, where, owing to the relatively small damper masses required, correspondingly low damping values are required.

The following alternatives can be realised here in accordance with the invention:

additional damping by damping materials: the running rollers (1.2) and drive wheels (1.3) can be made of damping materials. These can be plastics, such as, for example, polyurethane and all types of elastomers. Systems having damping running rollers can be used for applications in which no temperature variations greater than 20° C. occur. However, since the damping elastic rollers by plastics or elastomer is temperature-dependent, the running rollers are employed with the lowest possible damping and the damping is achieved by additional elements which do not experience any temperature influence. For the drive wheel (1.3), however, a material having a greater coefficient of friction, such as, for example, high-Shore polyurethane, is used in order to prevent this from slipping on the rail or running tube. At the same time, the drive wheel has the highest drive force owing to the weight distribution. The freely rolling running wheels 1.2 and the transverse support rollers (1.7) are used of materials having a low friction value (Teflon, polyester, steel). With this combination, relatively little temperature-dependent damping is achieved by rolling resistances. The greater proportion of the requisite damping can thus be achieved by additional temperature-independent dampers.

additional damping in the rotating region of the flywheel (FIG. 9):

(a) A simple method here is to design the flywheel with a cylindrical cavity and to achieve the damping by components rotating in the cavity (sand, steel balls, liquid).

(b) A further, more elegant method is the use of a Eddy current damper, as is known per se from the prior art. To this end, either the flywheel is fitted, for example, on the outside diameter with permanent magnets (40.2) and at the same time an electrical conductor disc, for example made from aluminium or copper (40.3) is attached to a nonrotating steel plate, which is, for example, part of the vibrating mass (FIG. 9). However, it is conversely also possible to make the rotating flywheel itself from aluminium or copper or corresponding alloys and to attach the magnets to the outside diameter or in a circular manner on the periphery of a fixed-mounted nonrotating plate, which is installed, for example, between the flywheel and the rotation mass. Due to the passage of the magnets over the aluminium plate, or vice versa, a resistance moment is achieved, which results in temperature-independent damping. The damping of such systems must be set as precisely as possible. In order to achieve this, in a further embodiment of the invention, an adjustment device (40.4), by means of which the flywheel (1.5) can be displaced axially and the air gap (40.6) can thus be changed for precise damping setting, is located on the drive shaft (1.10).

(c) A further possibility of achieving the damping are likewise magnets on the flywheel, which run in front of a fixed aluminium plate which widens towards the end. With the ever-widening aluminium plate, the area covered by the magnets becomes a greater, thus increasing the damping. This effects progressive damping at the end of the swing path.

additional damping in the region of the running wheels—rail arrangement (FIGS. 15, 16): in order to facilitate variable damping over the swing path of the absorber mass, Eddy current damping can also be accomplished via the running wheels (1.2)(1.3). In this case, the permanent magnets (80.4) are preferably arranged on one or also several of said wheels (80.3) (1.2)(1.3) and rotate with them. The wheels run past a conductor plate (80.1, 80.2), preferably made from aluminium, copper or alloys thereof, which is arranged parallel to them, during which the braking or damping Eddy current is generated. The conductor plate can be attached to a support plate or support rail (80.5) (5), or to a correspondingly arranged part of the running rail (4), but it may also be an independent component which forms the said support rail.

In a further embodiment FIGS. 15 and 16, the conductor plate is not of equal width, but instead is wider at the ends of the running rail device (80.1) than in the centre (80.2). Greater damping of the movement thus takes place at the end of the swing path than when passing through the centre. The advantage of this variable damping is that increasing amplitudes of the swinging of the absorber increases the damping. This is advantageous, in particular, in the case of intermittent loads on the tower of a wind turbine. Conversely, in this arrangement, only slight additional damping occurs in the region of small amplitudes, i.e. in the case of an only small deflection out of the central position of the vibration absorber, which enables the running rollers/running wheels to move even in the case of extremely small tower movements. Continuous distribution of the wheel bearing grease is thus achieved even in the case of extremely small tower movements or vibrations, which counters standstill wear of the bearing arrangements. FIG. 15 shows the corresponding arrangement in the region of maximum deflection of the swing mass. FIG. 16 shows the arrangement in the case of small movements of the vibration system or when passing through the central position.

In the case of fast-running systems with gearbox, braking magnets in accordance with the prior art can also be employed in accordance with the invention. These may also simultaneously be used as brake. It is also possible to use electric motors as brake. Vibration absorbers of this type can also be actively driven with these.

It has been shown in the course of practical application of this invention that the running or drive wheels of the device according to the invention may spin or slip under certain conditions. This is the case, in particular, in the case of ice formation, humidity/dampness or soiling of the installation by environmental influences or escaping lubricant. In a further embodiment of the invention (FIG. 17), the running surfaces of at least some of the wheels and running rails involved are therefore either coated with a stiff plastic having a low temperature-dependent coefficient of expansion, or alternatively have a toothed profile or toothed belt profile (91)(92) provided with cams, preferably with a flat contact surface (93). The toothed profile may itself be made from a correspondingly suitable plastic with which the wheels/rollers and the running rails are coated, or alternatively may itself be fashioned as a surface structure. A profile of this type has the advantage over conventional teeth that, owing to the said flat contact surface, relatively large vertical forces can be absorbed. At the same time, the cams ensure frictionally engaged transmission of the torque. In this embodiment, the friction-increasing profile may also be applied to only some of the wheels/rollers, but is preferably present at least on the drive wheel (1.3).

In the embodiment shown in FIG. 17, the wheel rolls with the total load on the teeth.

Alternatively, a conventional running wheel (without toothed profile) may be connected to an axially arranged toothed wheel, which in turn rolls on a toothed rack, which has the same radius as the running rail and is arranged alongside the running rail.

REFERENCE NUMERALS

1 entire movable part/running gear
1.1 absorber main mass
1.2 running wheels, free-rolling
1.3 drive wheel
1.4 drive wheel bearing arrangement
1.5 flywheel (without rotation mass)
1.6 variable mass for flywheel/rotation mass
1.7 transverse supporting rollers
1.8 movement direction absorber
1.9 movement direction flywheel
1.10 drive shaft
2 parking brake
2.1 magnet for parking brake
2.2 leaf springs for magnet guidance of the parking brake
3 retention construction
4 running rail
5 counterrunning rail/guide rail/support rail/retention device running device
6 end bend in running rail
7 running device (running rail, or running tube, or non-contact magnet system)
10 movable part with housing
10.1 gearbox
10.2 magnetic brake in accordance with the prior art
10.3 fast-rotating wheel
10.4 mass which can be displaced in radius
10.4.1 displacement unit
10.5 housing for roller damper
20 friction damper
20.1 lever for friction damper
20.2 mass, displaceable
20.3 friction lining
20.4 joint
20.5 stop
20.6 starling gap
21 running track with progressive curve
30 crosswise arrangement
30.1 running gear top
30.2 connecting element between running gear top and retention construction bottom
30.3 retention construction top
30.4 retention construction bottom
30.5 running gear bottom
30.6 mass bottom
30.7 flywheel mass top
30.8 flywheel mass bottom
40 magnetic damper/Eddy current damper
40.1 flywheel with arranged magnets
40.2 magnet arrangement
40.3 aluminium or copper disk
40.4 adjustment device for optimum damping adjustment of the air gap
40.5 steel plate
40.6 air gap
50 positioning in the nacelle
50.1 arrangement nacelle top (longitudinal direction)
50.2 arrangement on nacelle roof (longitudinal direction)
50.3 arrangement on nacelle roof (longitudinal direction) with housing
50.4 crosswise arrangement in the nacelle and on the nacelle roof
50.5 arrangement in and on the nacelle
50.6 transverse arrangement nacelle roof top
50.7 transverse arrangement nacelle roof inside
60 arrangement in the tower
60.1 absorber top
60.2 absorber bottom
60.3 tower attachment
60.4 frequency adjustment via additional tension springs
60.5 cable
70 round running tube
70.1 roller top (drive roller)
70.2 roller bottom
70.3 transverse roller
80 magnetic damper/Eddy current damper
80.1 conductor plate made from, for example, aluminium or copper—wide in the end regions of the running rail—along the wheel guide of an L-shaped running rail (4) or the guide rail (5).
80.2 conductor plate made from, for example, aluminium or copper—narrower region in the centre of the running rail—along the wheel guide of an L-shaped running rail (4) or the guide rail (5),
80.3 running wheels (1.2) (or drive wheels (1.3)) along the supporting plate (80.5)
80.4 magnet arrangement radial around running wheels/drive wheels
80.5 support plate with guide plate attached thereto (80.1, 80.2)
91 running wheels/drive wheel with tooth profile on running surface
92 belt profile/layer on running rail/running roller (4)

93 flat footprint toothed belt profile or toothed profile of the running wheel

The invention claimed is:

1. A vibration absorber which can be matched variably to an interfering frequency and which can be employed in a wind turbine or an installation, a building and machine having similar vibration properties, the vibration absorber comprising:
a running gear (1),
an absorber main mass (1.1),
a running device comprising at least one correspondingly shaped running rail (4), which is attached to a retention construction (3), where the absorber main mass is mounted on the running gear,
the running device is substantially curved in a concave manner and circular, at least in its central region, and the running gear (1) and the absorber main mass (1.1) being movable or displaceable out of a central position or a vertex position on the running device via wheels or rollers (1.2)(1.3)(1.7)(70.1)(70.2)(70.3) in accordance with the vibration forces initiating movements and effective in the direction of the running device,
wherein the running gear (1) and the absorber main mass (1.1) (30.6) has at least one driven, disc-shaped, rotationally symmetrical rotation mass component (1.5)(1.6)(30.7)(30.8) having an axis of rotation perpendicular to a plane of the circular track of the running device, which moves together with the absorber main mass, and the direction of rotation substantially corresponds to a respective direction of the moved running gear along the running device, where the at least one rotation mass component has a variable rotating mass (1.6) which corresponds to 1%-30% of the absorber main mass, depending on a diameter of the rotating mass.

2. The vibration absorber according to claim 1, wherein the rotation mass component (1.5)(1.6)(30.7)(30.8) is driven via at least one drive wheel (1.3).

3. The vibration absorber according to claim 2, wherein the drive wheel (1.3) runs on a running rail (4) of the running device.

4. The vibration absorber according to claim 3, wherein the drive wheel (1.3) runs on a different running rail (4) of the running device than the free-running running wheels (1.2).

5. The vibration absorber according to claim 2, wherein drive wheel (1.3) has at least one of:
an identical speed of rotation, a higher speed of rotation, or a lower speed of rotation; and
an identical diameter as the running wheels (1.2).

6. The vibration absorber according to claim 2, wherein the drive wheel (1.3) has at least one of:
(i) a high coefficient of friction against the material of the running device, or
(ii) is tensioned against the running device by tensioning means in order to increase friction.

7. The vibration absorber according to claim 2, wherein a gearbox is installed between the drive wheel (1.3) and the rotation mass unit (1.5)(1.6)(30.7)(30.8), so that a speed of rotation of the rotation mass unit is greater than that of the drive wheel.

8. The vibration absorber according to claim 2, wherein drive wheel (1.3), and thus a flywheel (1.5) of the rotation mass component, is actively driven by a motor.

9. The vibration absorber according to claim 1, wherein the vibration absorber has an additional device for damping vibrations.

10. The vibration absorber according to claim 9, wherein the additional device is an Eddy current damper, which is accommodated and effective in the rotation mass component and/or in the region of the running wheels or running rollers in combination with at least one running rail (4).

11. The vibration absorber according to claim 10, wherein the Eddy current damper (40) is accommodated in the rotation mass component and comprises a magnet arrangement (40.2) comprising permanent magnets and an electrical conductor disc (40.3), where conductor disc and magnet arrangement are arranged and fixed opposite one another, separated by an air gap which can be adjusted by an adjustment device (40.4) in such a way that the permanent magnets and the electrical conductor disc (40.3) are movable relative to one another by rotation of a flywheel (1.5) or the rotation mass (1.6)(30.7)(30.8).

12. The vibration absorber according to claim 11, wherein
(a) the magnet arrangement (40.2) is arranged on the periphery of the flywheel (1.5) and the conductor disc (40.3) is mounted in a fixed manner between the magnet arrangement and the rotation masses (1.6)(30.7)(30.8), or
(b) the flywheel (1.5) is provided with an electrically co-rotating conductor disc (40.3) or is itself the conductor disc, and the magnet arrangement of permanent magnets opposite is arranged on a non-co-rotating plate which is located between the flywheel (1.5) and the rotation masses (1.6)(30.7)(30.8).

13. The vibration absorber according to claim 10, wherein the Eddy current damper (80) is accommodated in a region of at least one running wheel (80.3) in combination with at least one running rail (4), and has a conductor plate (80.1)(80.2) along the running rail or along a support plate (80.5), and the magnet arrangement (80.4) comprising permanent magnets mounted on at least one running wheel (80.3) in such a way that the Eddy current damping takes place on rolling of the running wheel on the running rail along the conductor plate (80.1)(80.2) arranged in parallel.

14. The vibration absorber according to claim 13, wherein the conductor plate (80) is designed along the running path of the running wheel (80.3) on the running rail (4) in such a way that the conductor plate (80) has a greater width in a region of the two ends (80.1) of the running rail than in the center (80.2) of the running rail, so that less Eddy current damping occurs on passage of the running gear (1) and the damper main mass (1.1) through the central position of the curved running rail than in two opposed end regions.

15. The vibration absorber according to claim 1, wherein the running device has a correspondingly shaped round running tube (70).

16. The vibration absorber according to claim 15, wherein the running device has at least two running rails (4) which run parallel to the direction of movement of the running gear (1), and the running rails have one of an identical radius or a different radius of curvature.

17. The vibration absorber according to claim 15, wherein the running gear (1) and the absorber main mass (1.1)(30.6) are movable on two running wheels or running rollers (1.2) on one and the same running rail (4) or on one and the same running tube (70).

18. The vibration absorber according to claim 15, wherein a drive wheel (1.3) runs on a same running tube (70) of the running device as the free-running running wheels (1.2).

19. The vibration absorber according to claim 1, wherein the vibration absorber further comprises:

(i) a first lower vibration comprising the running gear (30.5), the absorber main mass (30.6) and the rotation mass (30.8) which are moved on the running/retention device (30.4), and (ii) a second upper vibration absorber comprising another running gear (30.1) and another rotation mass (30.7) which are moved on the running/retention device (30.3), but without its own absorber main mass, which together from an vibration absorber arrangement for damping excitation of vibrations from two different directions, wherein the lower and the upper vibration absorbers form an angle with one another with respect to their running devices, and the lower vibration absorber is connected to the running gear (30.1) of the upper vibration absorber by a connecting element (30.2) attached to its running/retention device and is thus suspended freely on this upper running gear (30.1) and is moved with the latter in the direction of the running device (30.3) of the upper vibration absorber, including the absorber main mass (30.6), while the running gear (30.5) of the lower vibration absorber, including the same absorber main mass (30.6), can be moved simultaneously in the direction of its own, different running device (30.4), in accordance with the effective interfering vibrations occurring in the two different directions.

20. The vibration absorber according to claim 19, where at least two vibration dampers are positioned in different directions with respect to alignment of their running device.

21. The vibration absorber according to claim 19, wherein, in order to damp different direction-dependent interference frequencies, the individual differently arranged vibration absorbers have at least one of different absorber masses (1.1)(1.6) and different radii of curvature of the running device (7).

22. The vibration absorber according to claim 19, wherein the vibration absorber or the vibration absorber arrangement is used for damping interfering vibrations below 0.5 to 1 Hz by adapting the frequency up to 30% relative to the initial value.

23. The vibration absorber according to claim 1, wherein the rotation mass component comprises a flywheel (1.5)(10.3) having a drive axle or a shaft and one or more mass discs (1.6), which can be pushed onto the axis or shaft of the flywheel.

24. The vibration absorber according to claim 23, wherein the individual mass discs can be displaced radially outwardly and inwardly.

25. The vibration absorber according to claim 23, wherein the vibration absorber has a device (10.4) which enables a diameter of the mass discs (1.6) to be changed, or a mass center of gravity of the rotating mass to be changed radially, or in that mass discs (1.6) of different diameter are employed.

26. The vibration absorber according to claim 1, wherein the running gear (1) and the absorber main mass (1.1)(30.6) is movable to and fro on at least two running wheels or running rollers (1.2) on the curved running device.

27. The vibration absorber according to claim 26, wherein the running wheels or running rollers (1.2)(1.3)(1.7)(70.1)(70.2)(70.3)(80.3)(90) are a same size, and the at least two running rails have an identical radius.

28. The vibration absorber according to claim 1, wherein the running device has at least one correspondingly shaped running rail (4), and the running rail and the running surface of at least one of the running wheels or running rollers (1.2)(1.3)(1.7)(70.1)(70.2)(70.3) (80.3)(90) has a coating, covering or surface structure which increases frictional forces.

29. The vibration absorber according to claim 28, wherein the coating, covering or surface structure of the at least one running rail (4) and of the running surface of the at least one running wheel is in the form of teeth or cam profiles which engage with one another.

30. The vibration absorber according to claim 1, wherein the vibration absorber has a mechanical, electromagnetic or magnetic parking brake (2) which enables the absorber to be operationally switched on and off, where the parking brake holds or releases the rotation mass component (1.5)(1.6)(30.7)(30.8).

31. The vibration absorber according to claim 1, wherein the vibration absorber has a friction damper (20)(20.1)(20.2)(20.3)(20.4)(20.5) as an end position damper in order to prevent the running gear (1) with the main mass (1.1) and the rotation mass (1.6) from hitting the ends of the running device (7).

32. The vibration absorber according to claim 1, wherein the curve radius of the running device is smaller at the ends than in the central region.

33. The vibration absorber according to claim 1, wherein a spring device (60.4) is attached to one end of the running gear (1) or damper mass (1.1) and is connected at the other end to the installation to be damped.

34. The vibration absorber according to claim 1, wherein the vibration absorber has a running device (7) comprising either two identically or differently curved running rails (4) which run in parallel to the direction of movement, two free-running running wheels (1.2) arranged one behind the other, which run on the first running rail (4), and a drive wheel (1.3), which is arranged on the second running rail (4) opposite the two free running wheels and is connected to an outward-facing flywheel (1.5) having at least one mass disc (1.6), where drive wheel and running wheels as well as absorber main mass are parts of the running gear (1).

35. The vibration absorber according to claim 1, wherein the vibration absorber comprises:

(i) a running device comprising a round tube (70), (ii) two drive wheels (70.1) arranged one behind the other, which each drive a rotation mass component (1.5)(1.6), (iii) two further running wheels (70.2) arranged one behind the other, which are arranged opposite the drive wheels (70.1), and (iv) at least two opposite, supporting transverse wheels, which are arranged perpendicular to the plane of the drive wheels, where all wheels and have a running surface shaped in a concave manner in accordance with the tube curvature, by which they can be moved to and fro on the tube, and where the wheels and their bearings are tensioned against one another by corresponding tensioning means so that functionally perfect movement of the running gear (1) on the tube, including the absorber main mass (1.1), is ensured.

36. A wind turbine having at least one vibration absorber or an arrangement of vibration absorbers according to claim 1.

* * * * *